US007146347B1

(12) United States Patent
Vazquez et al.

(10) Patent No.: US 7,146,347 B1
(45) Date of Patent: Dec. 5, 2006

(54) SYSTEM AND METHOD FOR AUTOMATICALLY CREATING A PROTOTYPE TO PERFORM A PROCESS

(75) Inventors: Nicolas Vazquez, Austin, TX (US); Kevin L. Schultz, Georgetown, TX (US)

(73) Assignee: National Instruments Corporation, Austin, TX (US)

( * ) Notice: Subject to any disclaimer, the term of this patent is extended or adjusted under 35 U.S.C. 154(b) by 659 days.

(21) Appl. No.: 09/631,212

(22) Filed: Aug. 3, 2000

(51) Int. Cl.
*G06F 15/18* (2006.01)
*G06F 9/44* (2006.01)
(52) U.S. Cl. .......................... 706/12; 717/104; 706/48
(58) Field of Classification Search ................ 717/100, 717/104–109; 706/12–21, 45, 48, 51, 55, 706/56
See application file for complete search history.

(56) References Cited

U.S. PATENT DOCUMENTS

| | | | |
|---|---|---|---|
| 4,831,580 A | | 5/1989 | Yamada |
| 4,949,253 A | * | 8/1990 | Chigira et al. ............. 717/107 |
| 5,005,119 A | | 4/1991 | Rumbaugh et al. |
| 5,181,259 A | * | 1/1993 | Rorvig ....................... 382/225 |
| 5,363,202 A | * | 11/1994 | Udagawa et al. ........... 358/501 |
| 5,481,712 A | * | 1/1996 | Silver et al. ................. 717/109 |
| 5,548,700 A | * | 8/1996 | Bagley et al. ............. 715/540 |
| 5,623,659 A | | 4/1997 | Shi et al. |
| 5,631,974 A | | 5/1997 | Lau-Kee et al. |
| 5,675,801 A | * | 10/1997 | Lindsey ....................... 717/108 |
| 5,742,504 A | | 4/1998 | Meyer et al. |
| 5,862,372 A | | 1/1999 | Morris et al. |
| 5,917,944 A | * | 6/1999 | Wakisaka et al. ........... 382/190 |
| 5,940,296 A | | 8/1999 | Meyer |
| 5,940,530 A | * | 8/1999 | Fukushima et al. ......... 382/164 |
| 5,995,757 A | * | 11/1999 | Amberg et al. .............. 717/175 |
| RE36,602 E | * | 3/2000 | Sebastian et al. ........ 364/468.03 |
| 6,053,951 A | | 4/2000 | McDonald et al. |
| 6,173,275 B1 | * | 1/2001 | Caid et al. ..................... 706/14 |
| 6,263,362 B1 | * | 7/2001 | Donoho et al. ............. 709/207 |

(Continued)

OTHER PUBLICATIONS

"Windows 98 For Dummies" by Andy Rathbone, Hungry Minds, 1998.*

(Continued)

*Primary Examiner*—Anil Khatri
(74) *Attorney, Agent, or Firm*—Meyertons Hood Kivlin Kowert & Goetzel, P.C.; Jeffrey C. Hood; Jason L. Burgess

(57) ABSTRACT

A system and method for enabling a prototyping environment application to automatically create a plurality of prototypes, wherein each of the plurality of prototypes is configured to perform a process to solve a particular problem. In response to receiving user input requesting the automatic creation of a prototype, the prototyping environment may display a list of items, wherein each item visually indicates a particular problem. In response to the user specifying an item, the prototyping environment is operable to create a prototype including a plurality of elements operable to interact in order to perform a process to solve the problem indicated by the specified item. The prototyping environment is preferably operable to receive and use solution information updates enabling the automatic creation of a new prototype, i.e., a prototype configured to perform a process to solve a new problem. For example, the vendor of the prototyping environment or third-party developers may periodically provide solution information updates which users can download or which the prototyping environment is operable to automatically retrieve. Users may also be able to request and receive solution information updates enabling the prototyping environment to automatically create a prototype to perform a process to solve a particular problem.

34 Claims, 27 Drawing Sheets

U.S. PATENT DOCUMENTS

| | | | |
|---|---|---|---|
| 6,298,474 B1 | 10/2001 | Blowers et al. | |
| 6,366,300 B1 | 4/2002 | Ohara | |
| 6,418,424 B1* | 7/2002 | Hoffberg et al. | 706/21 |
| 6,637,022 B1 | 10/2003 | Weeren et al. | |
| 6,658,399 B1* | 12/2003 | Acharya et al. | 706/52 |
| 6,760,714 B1* | 7/2004 | Caid et al. | 706/14 |
| 6,763,515 B1* | 7/2004 | Vazquez et al. | 717/109 |
| 7,043,463 B1* | 5/2006 | Bonabeau et al. | 706/13 |
| 7,051,317 B1* | 5/2006 | Vazquez et al. | 717/104 |
| 7,076,472 B1* | 7/2006 | Addison | 706/13 |
| 7,079,141 B1* | 7/2006 | Vazquez et al. | 345/440 |
| 2002/0191023 A1* | 12/2002 | Chandhoke et al. | 345/771 |

OTHER PUBLICATIONS

Chin et al, "Model based recognition in Robot vision", ACM Computing Surveys, vol. 18, No. 1, pp. 67-108, Mar. 1986.*

Tsutsumi et al, "Hybrid approach of video indexing and machine learning for rapid indexing and highly object recognition", IEEE, pp. 645648, 2001.*

Barnard et al, "Matching words and pictures", Jour. of machine Learning Resh. pp. 1107-1135, 2003.*

Blanc et al, "The virtual learning space on interactive 3D environment", ACM pp. 93-191, 2005.*

Ji et al, "Machine interpretation of CAD for manufacturing applications", ACM computing surveys vol. 24, No. 3, pp. 264-311.*

Optilab Image Processing and Analysis Software for the Apple Macintosh™ II, User's Manual, dated 1990.

MacUser, John Rizzo, Image Analyst and Enhance, Jul. 1990, pp. 55-58.

SPIE—The International Society for Optical Engineering, Steven Rosenthal and Larry Stahlberg, "Integrated Approach to Machine Vision Application Development", vol. 1386, Nov. 8, 1990, pp. 158-162.

Automatix News Release, www.applefritter.com/macclones/automatix/newsrelease, Vision for Process Feedback and Control, Jul. 3, 2000, pp. 1-3.

IPLab, Serious Image Processing for the Macintosh II, 1990.

SPIE—The International Society for Optical Engineering, Michael S. Mort and Robert J. Fontana, "Low Cost Image Analysis Workstation Which is Menu Driven and Extensible," vol. 1232, Feb. 4, 1990, pp, 380-389.

IPLab™, User's Guide, Signal Analytics Corporation, 1991.

MacGuide Magazine, vol. 2, Issue 4, Stuart Gitlow, M.D., "X-Ray Vision," Jun. 1989, pp. 89-94.

Ric Ford, Optimage Processes Scientific Images, 1994.

Signal Analytics Corp., News Release, "Signal Analytics Brings Powerful Scientific Image Processing to the Macintosh II", Feb. 1, 1990 (2 pgs.).

"IMAQ Vision Builder Tutorial," National Instruments, Jan. 1999.

Hunt, Niel, IDF: A graphical dataflow programming language for image processing and computer vision,' p. 351-360, IEEE 1990 retrieved from the IEEE database Jan. 7, 2003.

Keddy, W.A., Agathoklis, P., "DEDIP: A User-friendly environment for digital image processing algorithm development", p. 733-736, IEEE 1991, retrieved from the IEEE database Jan. 7, 2003.

Konstantinides, Konstantinos et al., The Khoros Software Development Environment for Image and Signal Processing', p. 1-14, 1992, retrieved from http://www.hpl.hp.com/techreports/92/HPL-92-96.pdf on Jan. 7, 2003.

Sim, Young-Seok et al., "Design and Implementation of the Visual Programming Environment for the Distributed Image Processing," p. 149-152, IEEE 1996, retrieved from IEEE database Jan. 7, 2003.

SILMA Products—Production PILOT from Internet site "www.adept.com/Silma/products/pd-productionpilot.html," May 24, 2001, 4 pages.

Newtonium, RoboWorks from Internet site www.newtonium.com/public_html/Products/RoboWorks/RoboWorks.htm, Mar. 30, 2002, 3 pages.

National Instruments "The Measurement and Automation Catalog 2002" pp. 97 and 580-594.

Computor "Motion Builder Start-Up Guide& Tutorial" Oct. 1996, 91 pages.

Computor Motion Architect User Guide, Aug. 1994, 23 pages.

GE Fanuc Automation "Software Solutions" 2002, 8 pages.

GE Industrial Systems CIMPLICITY Machine Edition—Motion Developer, Drawings, Dec. 6, 2001, 4 pages.

GE Fanuc Automation CIMPLICITY Machine Edition, ©2000, 4 pages.

Servo Catalogue "Motion Builder: Making Motion Control Programming Easy", undated, pp. 86-87.

US 6,094,526, 07/2000, Marrion et al. (withdrawn)

\* cited by examiner

SYSTEM AND METHOD FOR AUTOMATICALLY CREATING A PROTOTYPE TO PERFORM A PROCESS

FIELD OF THE INVENTION

The present invention relates to the field of prototyping environment applications, i.e., applications for creating prototypes to solve problems in such fields as image processing, machine vision, image analysis, robotics, process control, industrial automation, test and measurement, simulation, workflow processes, robotics, etc. More particularly, the invention relates to a prototyping environment application enabled to automatically create a plurality of prototypes, wherein each of the plurality of prototypes is configured to perform a process to solve a particular problem.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as conventional programming environments.

Increasingly computers are required to be used and programmed by those who are not highly trained in computer programming techniques. When conventional programming environments are used, the user's programming skills and ability to interact with the computer system often become a limiting factor in the achievement of optimal utilization of the computer system.

There are numerous subtle complexities which a user must master before he can efficiently program a computer system in a conventional programming environment. The task of programming a computer system to model or implement a process often is further complicated by the fact that a sequence of mathematical formulas, mathematical steps or other procedures customarily used to conceptually model a process often does not closely correspond to the conventional programming techniques used to program a computer system to model such a process. In other words, the requirement that a user program in a conventional programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a conventional programming environment to implement his model, the efficiency with which the computer system can be utilized to perform such modeling often is reduced.

Examples of fields in which computer systems are employed to analyze, model and/or control physical systems are the fields of machine vision, image processing, instrumentation, process control, industrial automation, and simulation, among others. Computer modeling or control of devices such as instruments or industrial automation hardware has become increasingly desirable in view of the increasing complexity and variety of instruments and devices available for use. However, due to reasons such as described above, the development and maintenance of the software elements in these systems often proved to be difficult.

Thus, various types of high-level prototyping environment applications have been developed that are targeted toward enabling users to quickly and easily develop prototypes to solve problems in a given problem domain. Prototyping environment applications may relate to any of various problem domains. For example, prototyping environments may be specialized for solving problems in fields such as machine vision, image processing, instrumentation, process control, industrial automation, simulation, etc. Prototyping environments may also be specialized for solving problems related to specific industries, such as electronics, automotive, pharmaceutics, chemical, etc.

A prototyping environment may integrate various capabilities in order to aid developers of problem solutions, depending on the particular problem domain. For example, a prototyping environment may provide a library of operations that are specific to a problem domain and may enable a user to select and execute various operations from the library. The prototyping environment may include a graphical user interface that is streamlined for interactively experimenting with various parameters associated with the selected operations and seeing the effects of the adjusted parameters. A prototyping environment may also include capabilities for simulating real-world objects or processes. A prototyping environment may be used to generate a recipe, solution, or script, also called a prototype, which represents an algorithm or process designed by the user in the prototyping environment.

One example of a specialized prototyping environment relates to the field of image processing. Image processing prototyping environments have been developed for rapidly developing image processing prototypes, e.g., to solve problems related to machine vision applications. Such an image processing prototyping environment may enable a user to easily and quickly experiment with an image, applying various image processing functions in order to manipulate, process, or analyze the image. For example, the user may construct a prototype including a sequence of steps, wherein each step represents a particular image processing function.

For several reasons, it would be desirable to enable a prototyping environment application to automatically create a plurality of prototypes, wherein each prototype is configured to perform a process for solving a particular problem. For example, the ability to automatically create specific prototypes may enable users to automatically construct a solution or a solution "template" for many general or common problems. Given a specific problem domain, it is likely that various general problems often arise in that problem domain. Enabling users to begin with a functional prototype may save the users time.

In addition to saving users time, the ability to automatically create specific prototypes may also help users learn to use the prototyping environment, e.g., by becoming familiar with various elements that may be included in prototypes. It may also be desirable to enable the prototyping environment to provide information explaining the process performed by each automatically created prototype, which may further help users to learn to use the prototyping environment.

It may also be desirable to enable a prototyping environment application to support a general framework enabling new prototype information to be added. For example, after a prototyping environment application has been installed, it would be desirable to update the prototyping environment application to create new prototypes constructed by the vendor of the application or by third-party developers, e.g., prototypes for solving new problems.

It would also be desirable to enable a user to request a solution to a custom problem from the vendor of the prototyping environment application and to enable the vendor to provide information usable by the prototyping environment application to automatically create a prototype configured to perform a process to solve the custom problem.

SUMMARY OF THE INVENTION

One embodiment of the present invention comprises a system and method for enabling a prototyping environment application to automatically create a prototype, wherein the prototype is configured to perform a process to solve a particular problem. For example, the prototyping environment application may automatically select a prototype from a plurality of existing prototypes in response to a user's selection of a problem. The prototyping environment may be designed to develop prototypes for solving problems in any of various problem domains. For example, the prototyping environment may be specialized for solving problems in one or more fields such as machine vision, image processing, instrumentation, process control, industrial automation, simulation, etc., and/or the prototyping environment may be specialized for solving problems related to one or more specific industries, such as electronics, automotive, pharmaceutics, chemical, etc.

Using the prototyping environment, a user may develop a prototype including a plurality of elements, wherein the elements are operable to interact in order to perform a process that solves a particular problem. For example, the prototyping environment may include a user interface allowing a user to interactively select from various elements to include in the prototype. The specific form of the elements included in the prototype may vary with particular prototyping environments. For example, in one embodiment the prototyping environment is operable to create prototypes comprising a sequence of steps, wherein each step represents a function or operation, and wherein the sequence of steps specifies a process. Prototypes developed in other prototyping environments may comprise different types of elements, or the elements may interact differently. For example, in various embodiments, prototypes may comprise various types of diagrammatic elements, object-oriented elements, etc.

A particular example of a prototyping environment operable to create prototypes for performing processes to solve image processing problems is described in detail. For example, using such an image processing prototyping environment, an automotive industry engineer may develop a prototype for inspecting a fusebox, e.g., in order to determine whether all the necessary fuses are present as fuseboxes are manufactured in real time. As another example, a semiconductor manufacturing engineer may develop a prototype for analyzing a circuit board to determine whether all the board components are present in their correct locations. An example is given of the interactive creation of a prototype for solving a problem referred to as "blob (Binary Large OBject) analysis".

According to one embodiment of the present invention, in addition to the interactive creation of prototypes, the prototyping environment is also enabled to automatically create various prototypes. For example, in response to user selection of a problem, the application may select a prototype from among a plurality of stored prototypes which implements a solution to the indicated problem. The ability to automatically create specific prototypes may provide users with many benefits. For example, this ability may enable users to automatically construct a solution or a solution "template" for many general or common problems. Given a specific problem domain, it is likely that various general problems often arise in that problem domain. For example, in the field of image processing, such general problems may include: how to count the number of distinct objects in an image of a particular color, shape, or size; how to measure the physical distance between two objects or points in an image; how to compare the pattern information of an object to a reference image; etc. Enabling users to begin with a functional prototype may save the users time.

In response to receiving user input requesting the automatic creation of a prototype, the prototyping environment may display information indicating a plurality of problems. For example, a window or dialog box including a list of items may be displayed, wherein each item corresponds to a particular problem. These items may, for example, comprise text and/or icons displayed in a selectable user interface list. Various information, such as text and graphics, describing the problem corresponding to the item may also be displayed, e.g., in order to help the user determine which item to choose in order to create the desired prototype. The items may be displayed in any of various ways, such as in a listbox control, on a menu, in a palette, etc.

The available problems from which to choose may not necessarily all be indicated together. For example, the problems may be categorized in various ways or may be indicated hierarchically in one or more levels. The appropriate categorization to use in indicating the problems may depend on the particular problem domain of the prototyping environment. For example, a prototyping environment associated with the field of image processing may categorize a problem according to one or more hierarchical levels indicating the general type of problem, such as shape, color, pattern, etc., while a prototyping environment associated with the field of instrumentation may categorize a problem according to a problem type such as initialization, data acquisition, data analysis, etc. Problems may also be categorized in various other ways, e.g., by industry group, such as automotive, biomedical, electronics, manufacturing, etc.

In response to the user specifying a problem, the prototyping environment is operable to create a prototype including a plurality of elements operable to interact in order to perform a process to solve the specified problem. For example, the prototyping environment may select a previously stored prototype, e.g., a sequence of steps, from a plurality of stored prototypes, which solves the specified problem. The prototyping environment may also operate to search for desired prototypes among one or more prototype databases on a network.

As described above, the prototype may comprise various types of elements, such as function or operation steps, objects, etc. After automatically creating a prototype, the user may test the prototype. For example, testing an image processing prototype may comprise requesting the prototyping environment to perform the process specified by the prototype on one or more images, e.g., by executing a series of image processing function steps included in the prototype. The user may then interactively modify the prototype as desired. For example the user may add elements to or remove elements from the prototype or may modify various elements included in the prototype, e.g., by modifying parameters or properties associated with the elements.

It is noted that in various embodiments, a user may specify a problem implicitly or in steps. In other words, problems may not necessarily be displayed and selected as atomic elements. For example, the prototyping environment may display a series of dialog boxes to obtain information regarding the process the user desires to perform and may then use this information to create an appropriate prototype.

In addition to saving users time, the ability to automatically create specific prototypes may also help users learn to use the prototyping environment, e.g., by becoming familiar with various elements, such as functions or objects, that may be included in prototypes. The prototyping environment may also be operable to provide help information explaining the process performed by an automatically created prototype. For example, the help information may comprise visual information, audio information, or other types of multimedia data. The help information may describe the process performed, for example, by explaining the purpose of the various elements included in the prototype and explaining the interaction among the elements.

In the preferred embodiment, after the prototyping environment application is installed, the application is operable to receive and use solution information enabling the automatic creation of a new prototype, i.e., a prototype configured to perform a process to solve a new problem. For example, the vendor of the prototyping environment may periodically provide solution information updates which users can download or which the prototyping environment is operable to automatically retrieve.

A solution information update may include information, such as text and graphics, that the prototyping environment uses to indicate a new problem along with the other problems that are indicated in response to a user request to automatically create a prototype. The solution information may also include information enabling the prototyping environment to automatically create a prototype performing a process to solve the new problem. For example, the solution information may include a list of elements to include in the prototype and may specify the appropriate configuration of those elements. In one embodiment, a solution information update may also extend the functional capabilities of the prototyping environment, e.g., by adding new elements, such as function steps, that can be included in prototypes.

In one embodiment, the prototyping environment may be able to receive solution information updates, e.g., new prototypes, from third-party developers. Enabling third-party developers to provide solution information updates may benefit users, for example, by greatly increasing the number and type of prototypes that can be automatically generated, which may save users development time, as discussed above. The vendor of the prototyping environment application may provide third-party developers with specification information describing how to construct solution information updates for the prototyping environment. For example, the solution information may need to be constructed as one or more files, wherein the files comprise information formatted in a particular way. In one embodiment, the prototyping environment may be operable to automatically create a solution information update from an existing prototype. In other words, after interactively creating a prototype for solving a particular problem, a third-party developer may request the prototyping environment to automatically create one or more files which can then be distributed to users as a solution information update.

In an alternative embodiment, information regarding new prototypes may be stored in one or more databases which are accessible over a network to the prototyping environment. The prototyping environments may hence be operable to analyze these databases and display new problems for selection by the user, as well as generate corresponding prototypes for the respective problems. This may operate to increase the number and type of prototypes that can be automatically generated.

By enabling the prototyping environment to receive solution information updates, users may also be able to request and receive solution information for specific problems. For example, a user may request the vendor to provide a solution for a particular problem, and the vendor may provide the user with a solution information update enabling the prototyping environment to automatically create a prototype to perform a process to solve the problem.

BRIEF DESCRIPTION OF THE DRAWINGS

A better understanding of the present invention can be obtained when the following detailed description of the preferred embodiment is considered in conjunction with the following drawings, in which.

Figure 1:
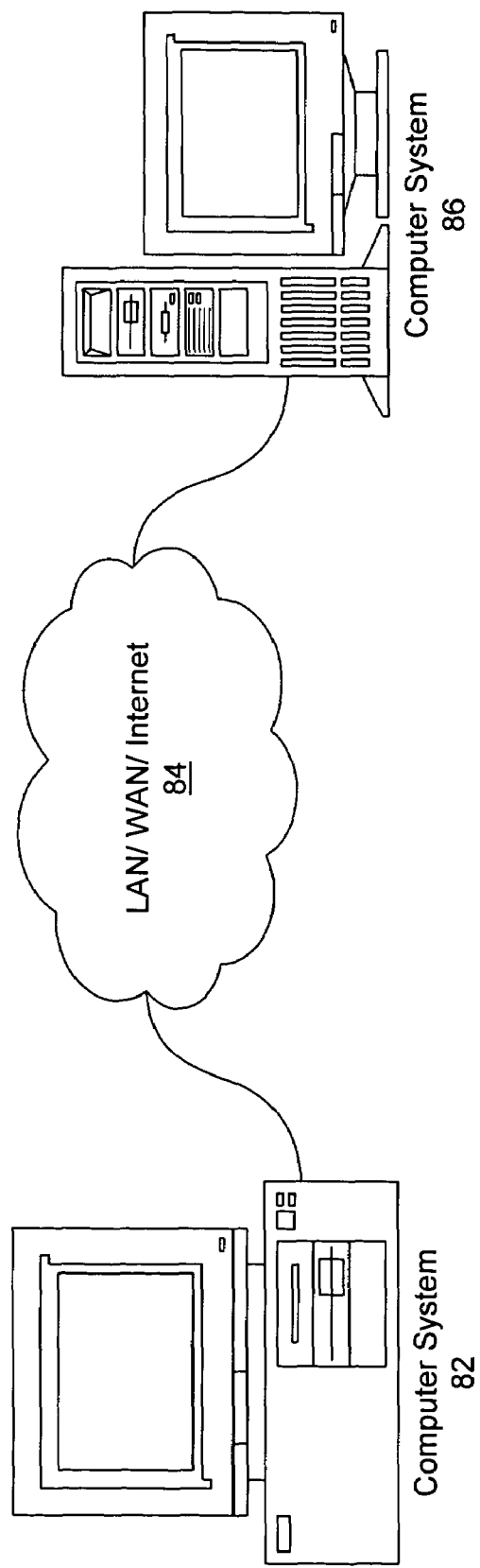
FIG. 1 illustrates a computer system connected through a network to a second computer system.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

FIG. 1—Computer System Connected to a Network

FIG. 1 illustrates an exemplary computer system 82. The computer system 82 can be any of various types, as desired. The computer system 82 includes or stores a prototyping environment application such as described above. The prototyping environment application may be used to create a prototype. As used herein, the term "prototype" is intended to include solutions, recipes, scripts, or other mechanisms which represent an algorithm, process, or solution to a problem. For example, a prototype may comprise a series or set of functions or operations that form an algorithm or process to solve a particular problem. A prototype may also comprise a diagrammatic, "object-oriented," or other type of solution representation which indicates functions or operations that may be performed to accomplish a desired algorithm or solve a particular problem.

A particular example of a prototyping environment, an image processing prototyping environment, is discussed below, but in other embodiments the prototyping environment may be used to develop prototypes in any of various fields or disciplines, such as image processing, image analysis, machine vision, process control, automation, test and measurement, simulation, motion control, robotics, audio, video, graphics, telecommunications, and workflow processes, among others. Examples of prototyping environments include IMAQ Vision Builder from National Instruments Corporation, Checkpoint from Cognex Corporation, and IPLab Spectrum from Scanalytic Corporation, among others.

As described below, the prototyping environment application is operable to automatically (or programmatically) create a plurality of prototypes, wherein each of the plurality of prototypes is configured to perform a process to solve a particular problem. The prototyping environment may receive solution information updates comprising information enabling the prototyping environment to automatically create new prototypes. For example, as shown in FIG. 1, the computer system 82 may be connected through a network 84 to a second computer system 86. For example, the user may select a menu option causing the prototyping environment to check for solution information updates, or the prototyping environment may be configured to automatically check for solution information updates. For example, the computer system 86 may be a computer server associated with the vendor of the prototyping environment application, and checking for solution information updates may comprise automatically establishing a network connection, e.g., a TCP/IP or other type of connection, with the computer system 86 and downloading one or more files which the prototyping environment application is operable to process.

Figure 2A:
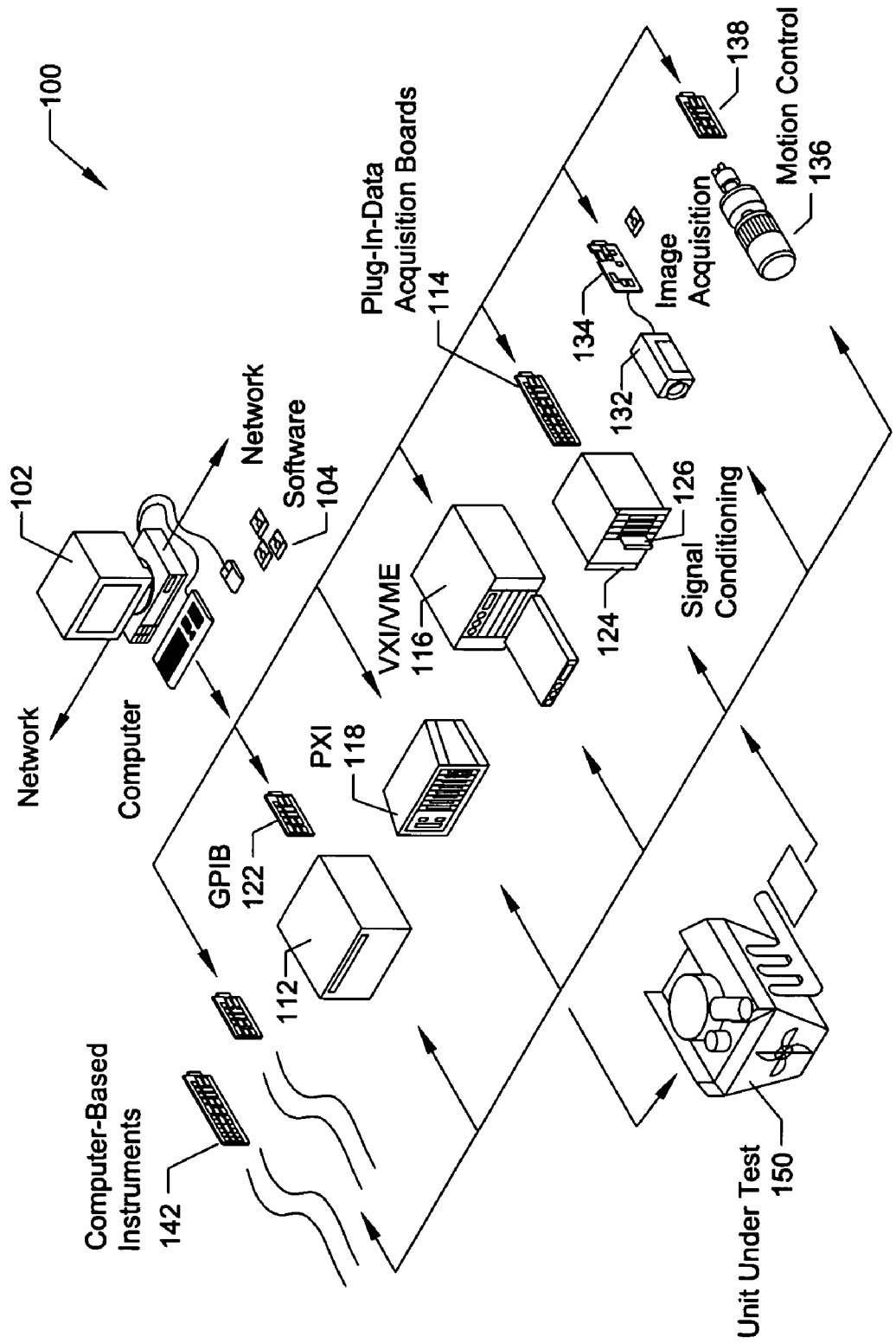
FIGS. 2A and 2B illustrate representative instrumentation and process control systems including various I/O interface options.
Figure 2B:
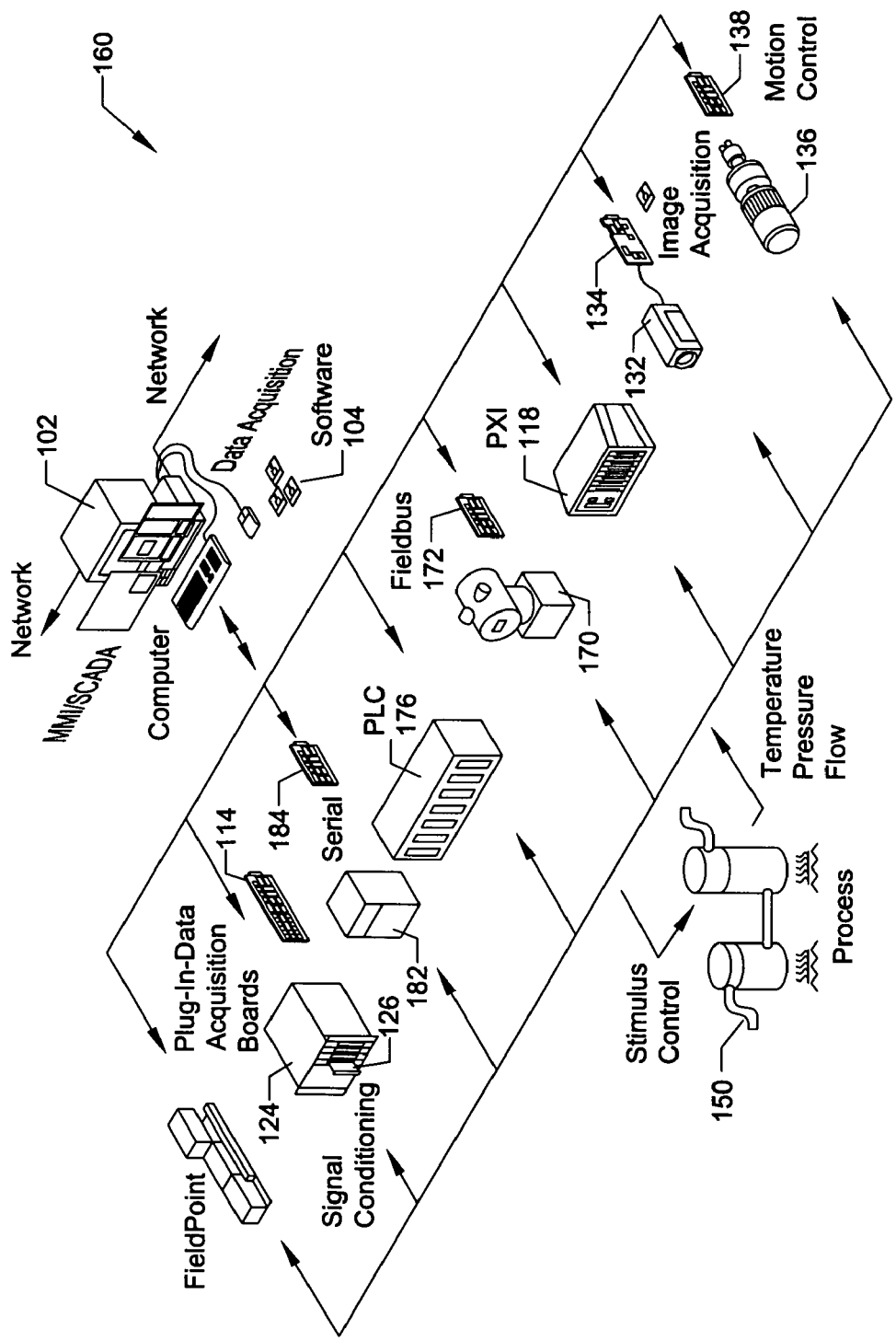

FIGS. 2A and 2B—Instrumentation and Industrial Automation Systems

FIGS. 2A and 2B illustrate exemplary systems which may store or use a prototyping environment application for automatically creating prototypes to solve problems, such as problems in the fields of image processing, machine vision, instrumentation, process control, or other fields. It is noted that the application of the present invention is not limited to prototyping environments targeted toward these fields. In other words, FIGS. 2A and 2B are exemplary only.

FIG. 2A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure, or control a unit under test (UUT) or process 150. The host computer 102 may store a prototyping environment application for creating a prototype, such as a prototype that performs a process involving interaction with or control of the one or more instruments.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 2B, the computer 102 may store a prototyping environment application for creating a prototype, such as a prototype that performs the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system 102 preferably includes a memory medium on which one or more computer programs or software components according to the present invention, e.g., the prototyping environment application, are stored. The term "memory medium" is intended to include an installation medium, e.g., a CD-ROM, floppy disks 104, or tape device, a computer system memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

As noted above, FIGS. 2A and 2B are exemplary only, and prototypes for any of various types of purposes may be automatically created using prototyping environments targeted toward any of various types of purposes, where the prototyping environment is stored in and executes on any of various types of systems.

Figure 3:
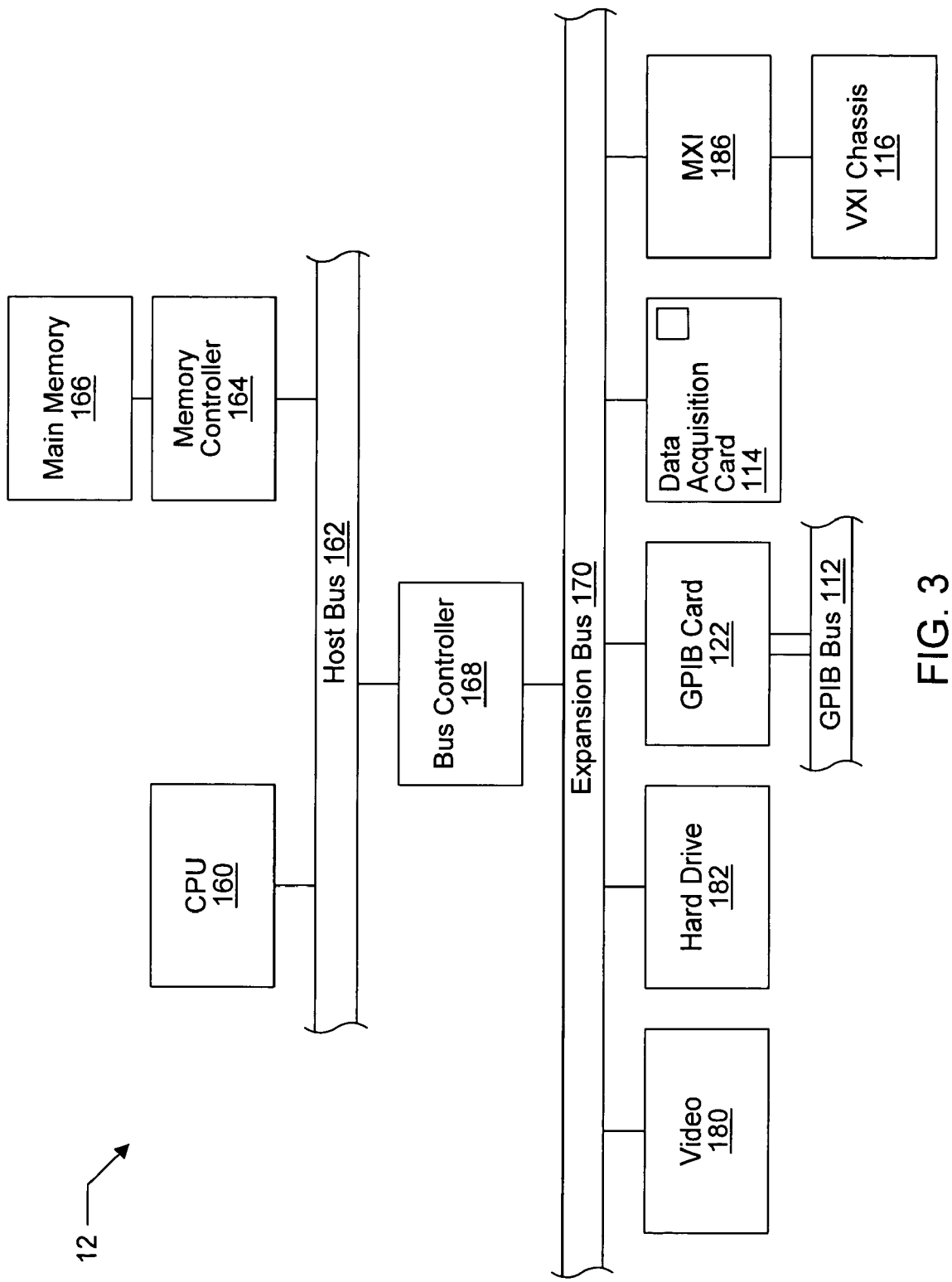
FIG. 3 is a block diagram of the computer system of FIGS. 1, 2A and 2B.

FIG. 3—Computer System Block Diagram

FIG. 3 is a block diagram of the computer system 82 or 102 illustrated in FIGS. 1, 2A, and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory or random access memory 166 is coupled to the host bus 162 by means of memory controller 164.

The main memory 166 stores computer programs according to the present invention. The main memory 166 also stores operating system software as well as the software for operation of the computer system, as well known to those skilled in the art. The computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 102 further comprises a video display subsystem 180 and hard drive 182 coupled to the expansion bus 170.

FIGS. 4–8: Automatic Creation of a Prototype

Figure 4:
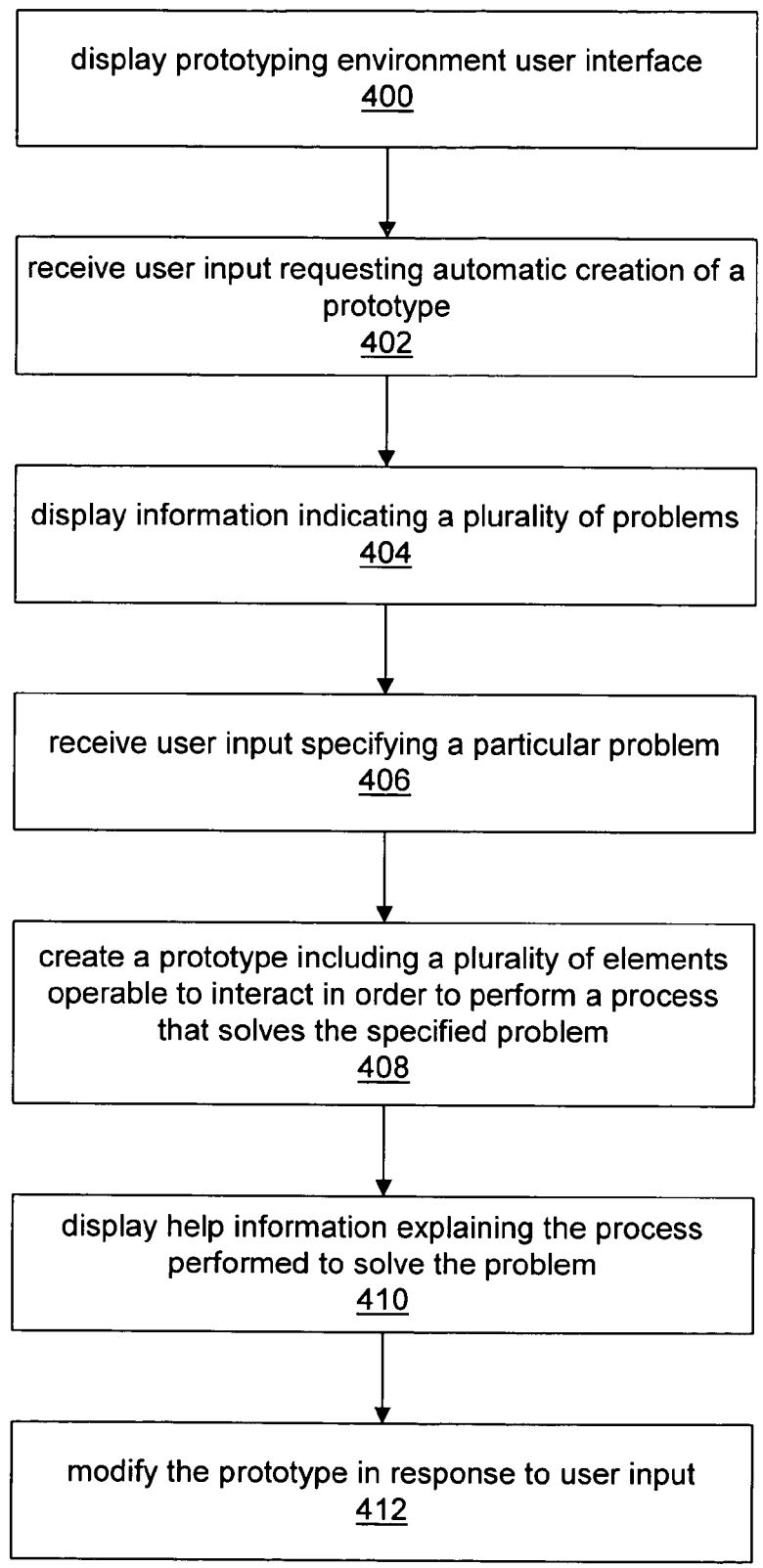
FIG. 4 is a flowchart diagram illustrating one embodiment of a method for automatically creating a prototype for performing a process to solve a problem.

FIG. 4 is a flowchart diagram illustrating one embodiment of a method for automatically creating a prototype for performing a process to solve a problem.

In step 400, a prototyping environment user interface is displayed. In addition to enabling the user to request the automatic creation of a prototype, the user interface may also enable the user to interactively develop a custom prototype. The prototyping environment user interface may be specialized or streamlined to enable users to develop solutions for problems encountered in any of various fields or industries. For example, the prototyping environment may be specialized for solving problems in one or more fields such as machine vision, image processing, instrumentation, process control, industrial automation, simulation, etc., and/or the prototyping environment may be specialized for solving problems related to one or more specific industries, such as electronics, automotive, pharmaceutics, chemical, etc. An exemplary user interface for an image processing prototyping environment is described below.

By interacting with the prototyping environment user interface, a user may develop a prototype including a plurality of elements, wherein the elements are operable to interact in order to perform a process that solves a particular problem. For example, the user may interactively select from various elements to include in the prototype, e.g., by selecting the elements from a menu or palette. The specific form of the elements included in the prototype may vary with particular prototyping environments. For example, in one embodiment the prototyping environment is operable to create prototypes comprising a sequence of steps, wherein each step represents a function or operation, and wherein the sequence of steps specifies a process. Prototypes developed in other prototyping environments may comprise different types of elements, or the elements may interact differently. For example, in various embodiments, prototypes may comprise various types of diagrammatic elements, object-oriented elements, etc. The user may configure the prototype elements. For example, a function step element may have various configurable parameters that can be configured, while an object element may have various configurable properties.

In various embodiments, as a prototype is being constructed, users may also request the prototyping environment to execute the process performed by the prototype or to apply various prototype elements, e.g., in order to experiment with various elements to see their effects. In response, the prototyping environment may update the displayed user interface, e.g., in order to indicate the current state of the prototype or to illustrate the effect of the process performed by the current elements in the prototype. For example, for an image processing prototyping environment, a user may select and apply various image processing functions to a displayed image. In response, the image processing prototyping environment may update the displayed image to illustrate the effect of the functions. If the image processing function had the desired effect, then the user may add the function to the prototype.

In addition to the interactive creation of a prototype by a user described above, the prototyping environment is also operable to automatically, i.e., programmatically create one or more prototypes, as described below with reference to steps 402–412.

In step 402, user input requesting the automatic creation of a prototype is received. For example, the user may select a menu option, e.g., a "Solution Wizard" menu option, requesting the display of one or more windows or dialog boxes for specifying a particular prototype to automatically create.

In step 404, information indicating a plurality of problems may be displayed, in response to the user input received in step 402. For example, step 404 may comprise displaying one or more windows or dialog boxes enabling the user to specify the desired problem for which to create a prototype. For example, a list of items may be displayed, wherein each item corresponds to a particular problem. These items may, for example, comprise text and/or icons displayed in a selectable user interface list. Various information, such as text and graphics, describing the problem corresponding to the item may also be displayed, e.g., in order to help the user determine which item to choose in order to create the desired prototype. The items may be displayed in any of various ways, such as in a listbox control, on a menu, in a palette, etc.

The available problems from which to choose may not necessarily all be indicated together. For example, the problems may be categorized in various ways or may be indicated hierarchically in one or more levels. The appropriate categorization to use in indicating the problems may depend on the particular problem domain of the prototyping environment. For example, a prototyping environment associated with the field of image processing may categorize a problem according to one or more hierarchical levels indicating the general type of problem, such as shape, color, pattern, etc., while a prototyping environment associated with the field of instrumentation may categorize a problem according to a problem type such as initialization, data acquisition, data analysis, etc. Problems may also be categorized in various other ways, e.g., by industry group, such as automotive, biomedical, electronics, manufacturing, etc.

Figure 5:
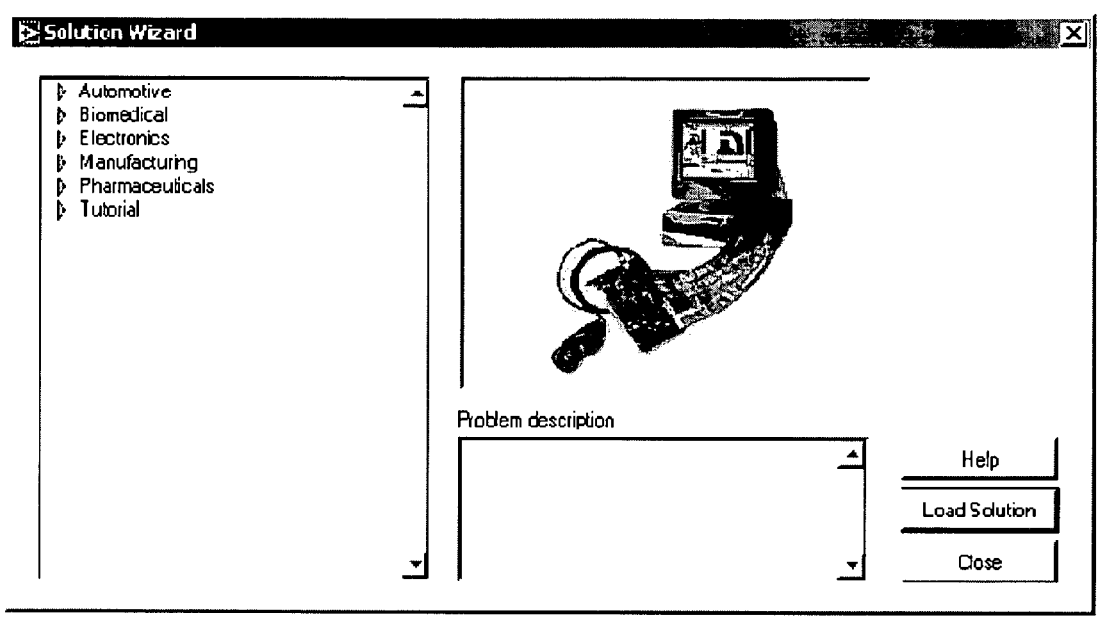
FIGS. 5–7 illustrate various states of a dialog box associated with an image processing prototyping environment, wherein the dialog box enables the user to specify a particular problem for which to generate a prototype solution.
Figure 6:
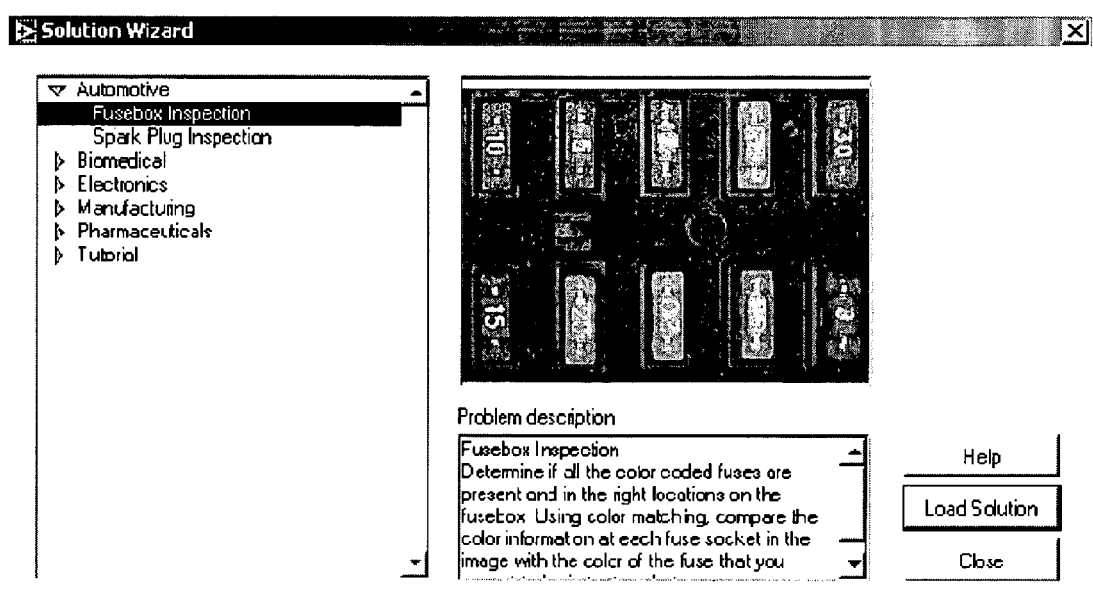
Figure 7:
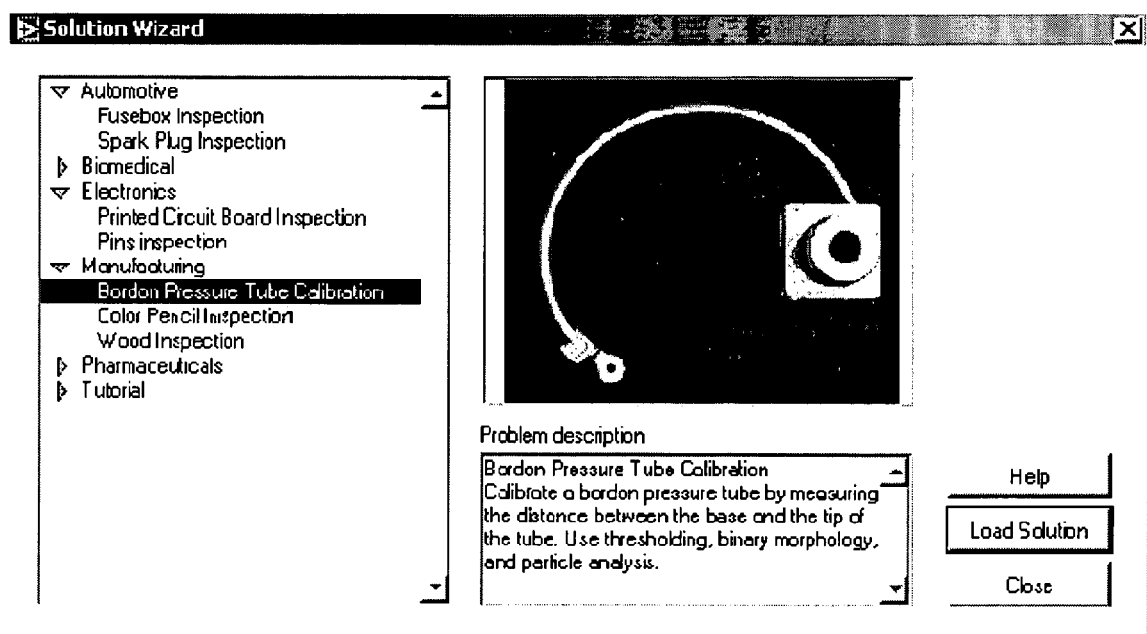

FIGS. 5–7 illustrate various states of a dialog box associated with an image processing prototyping environment, which is described below, wherein the dialog box enables the user to specify a particular problem. FIG. 5 illustrates various industries, such as automotive, biomedical, electronics, etc., into which problems may be categorized. By expanding these industries, the user can view a list of problems associated with each industry, as shown in FIGS. 6 and 7. FIG. 6 illustrates a list of problems associated with the automotive industry. Clicking on a particular item in the displayed list causes the dialog box to display information indicating a problem corresponding to the list item. For example, in FIG. 6, text information describing a Fusebox Inspection problem is displayed. The text explains that the problem relates to determining whether all necessary color-coded fuses are present in the correct locations in a fusebox. An graphic of a fusebox is also displayed in FIG. 6. FIG. 7 illustrates a list of problems associated with the manufacturing industry. In FIG. 7, text and graphics information describing a Bordon Pressure Tube Calibration problem is displayed.

It is noted that in various instances of a prototyping environment application, problems may be indicated implicitly or in steps. In other words, problems may not necessarily be displayed and selected as atomic elements. For example, the prototyping environment may display a series of dialog boxes to obtain information regarding the process the user desires to perform and may then use this information to create an appropriate prototype.

In step 406, user input specifying a particular problem is received. For example, in FIGS. 6 and 7 this input may be caused by the user clicking the "Load Solution" button.

In step 408, in response to the user specifying a problem, a prototype including a plurality of elements operable to interact in order to perform a process to solve the specified problem may automatically be created. For example, the method may use previously stored information specifying the elements to include in the prototype. In one embodiment, the system may store a plurality of prototypes, and the system selects a prototype corresponding to the user specified problem.

Figure 8:
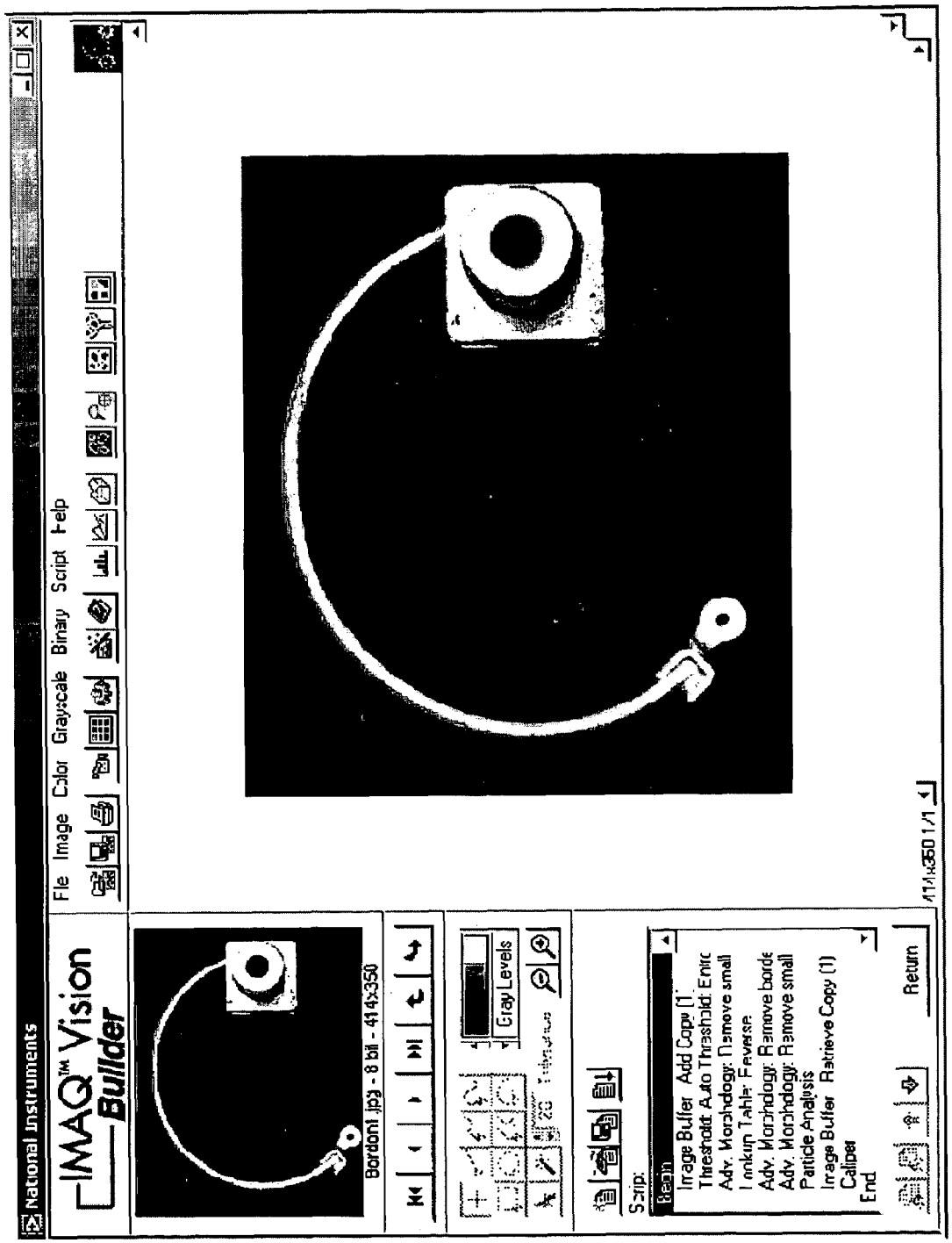
FIG. 8 illustrates one example of an automatically created prototype, wherein the prototype is configured to perform a process that solves a "Bordon Pressure Tube Calibration" problem described in FIG. 7.

FIG. 8 illustrates one example of an automatically created prototype which solves the Bordon Pressure Tube Calibration problem described in FIG. 7. In this example, the prototype includes a sequence of steps, wherein each step corresponds to an image processing function. The sequence of steps specifies a process utilizing image processing operations such as thresholding, binary morphology, particle analysis, etc., in order to measure the distance between the base and the tip of a Bordon pressure tube. As described above, in other embodiments, prototypes may include various other types of elements besides function steps, such as diagrammatic objects, etc.

Step 408 may also comprise automatically configuring the state of the prototyping environment in various ways, in addition to automatically creating the prototype. For example, the image processing prototype illustrated in FIG. 8 may be applied to various images. In response to receiving the user input in step 406, the sample image shown in FIG. 7 is loaded into the image processing prototyping environment, as shown in FIG. 8.

As shown in step 410, help information explaining the process performed to solve the specified problem may also be provided. For example, the user may select a menu option to display help text. The help information may also comprise audio information or other types of multimedia data. The help information may describe the process performed, for example, by explaining the purpose of the various elements included in the prototype and explaining the interaction among the elements. The help information may also describe possible modifications to the process or other approaches that may be taken to solve the problem.

After automatically creating a prototype, the user may test the prototype. For example, testing an image processing prototype may comprise requesting the prototyping environment to perform the process specified by the prototype on one or more images, e.g., by executing a series of image processing function steps included in the prototype.

As shown in step 412, the user may interactively modify the prototype as desired. For example the user may add elements to or remove elements from the prototype or may modify various elements included in the prototype, e.g., by modifying parameters or properties associated with the elements.

As noted above, FIG. 4 represents one embodiment of a method for automatically generating an image processing program, and various steps may be combined, omitted, added, reordered, or modified as desired. As an example, step 408 may be performed at various stages of the method.

Figure 9:
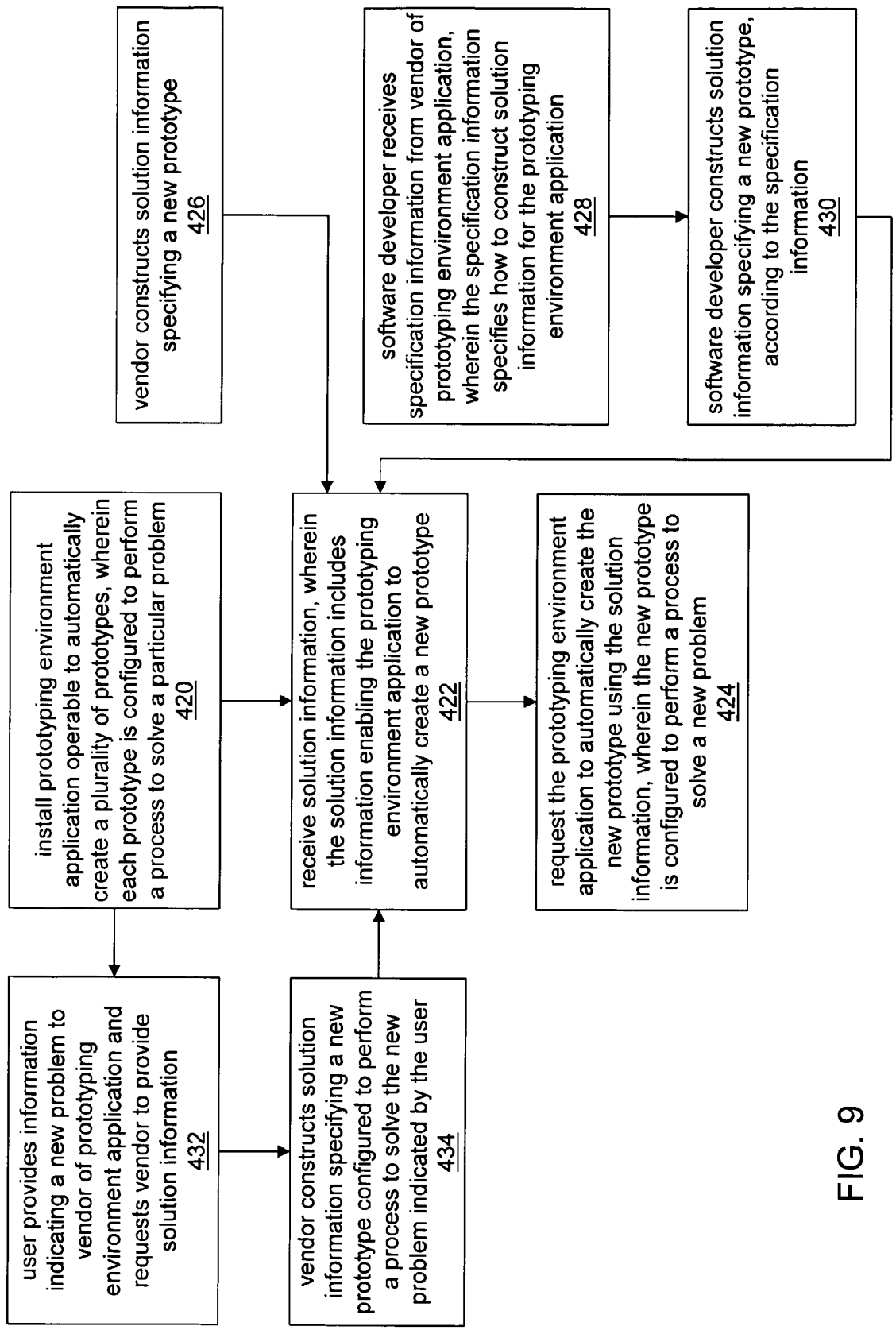
FIG. 9 illustrates a method for updating the prototyping environment application to enable the automatic creation of new prototypes for solving new problems.

FIG. 9—Updating the Prototyping Environment to Create New Prototypes

FIG. 9 illustrates a method for updating the prototyping environment application to enable the automatic creation of new prototypes for solving new problems. Updating the prototyping environment in this way may benefit users by increasing the number and types of prototypes that can be automatically created.

In step 420, the prototyping environment application is installed, e.g., on a computer system such as the computer system 82 shown in FIG. 1. Upon installation, the prototyping environment is preferably operable to automatically create a plurality of prototypes, wherein each prototype is configured to perform a process to solve a particular problem, as described above.

In step 422, a solution information update is received. A solution information update may include information, such as text and graphics, that the prototyping environment uses to indicate a new problem (or multiple new problems) along with the other problems that are indicated in response to a user request to automatically create a prototype. The solution information also includes information enabling the prototyping environment to automatically create a prototype performing a process to solve the new problem. For example, the solution information may include a list of elements to include in the prototype and may specify the appropriate configuration of those elements.

In one embodiment, a solution information update may also extend the functional capabilities of the prototyping environment. For example, a prototyping environment that creates prototypes including function steps may support a framework enabling new function steps to be added. For example, a function step may be packaged in accordance with a standard software component technology, e.g., as an ActiveX control, and may be distributed along with the solution information update.

The solution information update may be received in any of various ways. For example, the prototyping environment may include a menu option that the user can select to check for new updates, e.g., by automatically establishing a network connection, e.g., a TCP/IP connection, with a computer server associated with the vendor of the prototyping environment to obtain the updates. In another embodiment, the prototyping environment is operable to automatically check for solution information updates, e.g., at application launch time. The solution information update may be received as one or more files. The prototyping environment may be operable to use the files as they are or step 422 may also comprise processing the files, e.g., in order to extract and persistently store information enabling the creation of the new prototypes specified in the solution information update. In one embodiment, users can update the prototyping environment from the context of a solution information update file, e.g., by double-clicking the file from an operating system shell, which may invoke the prototyping environment application and cause the application to process the file or copy it to a correct location.

In step 424, the user may request the prototyping environment to automatically create a new prototype configured to perform a process to solve a new problem, as enabled by the solution information update. Information indicating the new problem is preferably indicated along with the previously existing problems, so that the user can specify the new problem as described above with reference to FIG. 4. The prototyping environment may utilize information in the solution information update to determine a category or hierarchy level at which to display this information, if applicable.

The solution information update may be obtained from various sources and/or may be obtained in response to a user request. For example, as shown in step 426 and described above, the vendor of the prototyping environment may construct solution information updates and distribute them or make them available to download.

In one embodiment, the prototyping environment may be able to receive solution information updates from third-party developers. For example, as shown in step 428, the vendor of the prototyping environment application may provide a third-party developer with specification information describing how to construct solution information updates for the prototyping environment. For example, the solution information may need to be constructed as one or more files, wherein the files comprise information formatted in a particular way. As shown in step 430, the third-party developer may then construct a solution information update specifying a new prototype, according to the specification information. The third-party developer may then distribute or make the solution information update available for users to download.

In one embodiment, the prototyping environment may be operable to automatically create a solution information update from an existing prototype. In other words, after interactively creating a prototype for solving a particular problem, a third-party developer may request the prototyping environment to automatically create one or more files which can then be distributed to users as a solution information update.

In one embodiment, the prototyping environment application may be operable to automatically digitally sign the solution information update, and a receiving prototyping environment application may be operable to validate the digital signature. For example, as described above, the solution information update may include executable code. By including digital signature functionality, users may be protected from malicious code to some degree. For more information on the use of digital signatures and digitally signed graphical programs, please refer to U.S. patent application Ser. No. 09/629,653, titled "System and Method for Creating, Evaluating, and Executing Digitally Signed Graphical Programs", filed Aug. 1, 2000, which is hereby incorporated by reference.

As shown in step 432, a user may also be able to provide information indicating a new problem to the vendor of the prototyping environment application and request the vendor to provide a solution information update solving the problem. In response, the vendor may provide the user with a solution information update enabling the prototyping environment to automatically create a prototype to perform a process to solve the problem, as shown in step 434. The ability to request particular problem solutions and receive the solutions may be integrated into the user interface of the prototyping environment.

In alternative embodiments, any of various other methods may be used to enable the prototyping environment application to automatically create new prototypes for solving new problems. For example, in one embodiment, information regarding new prototypes may be stored in one or more databases that are accessible over a network to the prototyping environment application. The prototyping environments may hence be operable to analyze these databases and display new problems for selection by the user, as well as generate corresponding prototypes for the respective problems.

FIGS. 10–17: Prototyping Environment User Interface

Figure 10:
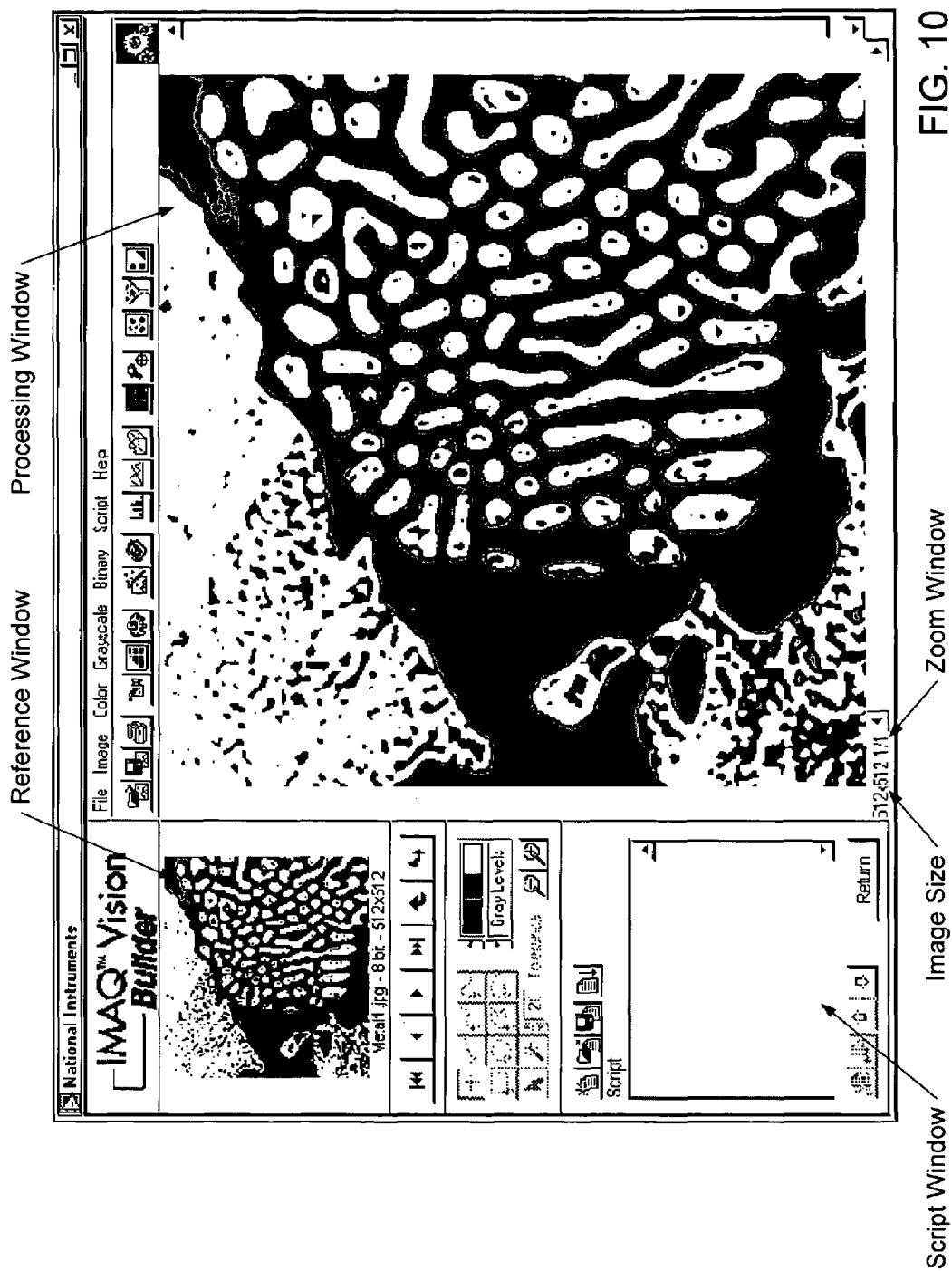
FIG. 10 illustrates an exemplary user interface for an image processing prototyping environment.

An image processing prototyping environment application is discussed herein, in order to gain a better understanding of the application of the present invention to a particular field. FIG. 10 illustrates an exemplary user interface for an image processing prototyping environment application. The image processing prototyping environment may enable a user to easily load an image and quickly apply various image processing functions or operations to the image, immediately seeing the results. The image processing operations selected and applied by the user are preferably recorded as a script. Once the desired image processing algorithm has been developed, the prototyping environment may then automatically create a standalone graphical program in response to the script, i.e., to implement the algorithm comprised in the script.

The image processing prototyping environment is operable to automatically generate various prototypes for solving particular problems. For example, in one embodiment the prototyping environment includes the user interface shown in FIGS. 5–7 to receive user input specifying a particular problem for which to generate a prototype. FIG. 8 illustrates an example of an automatically created prototype, which in this case comprises a script including image processing function steps.

In various embodiments, the image prototyping environment may be operable to load and manipulate any of various types of images, including gray-level and color images. The prototyping environment may also support complex images in which pixel values have a real part and an imaginary part. The images may be obtained from any of various sources. The images may, for example, be obtained from an image file, such as a BMP, TIFF, AIPD, PNG, JPG, or GIF file, or a file formatted according to another image format. The images may also be obtained from a hardware device, such as a camera. For example, images may be obtained from a device such as the video device 132 illustrated in FIGS. 2A and 2B, or from any of various other types of devices, including digital cameras, framegrabbers, etc.

The prototyping environment may support any of various image processing functions or operations. As used herein, the term "image processing" may include image processing, image analysis, and machine vision functions or operations, among others.

Image processing functions for processing an image may include functions such as:
   filtering functions for smoothing, edge detection, convolution, etc.
   morphology functions for modifying the shape of objects in an image, including erosion, dilation, opening, closing, etc.
   thresholding functions for selecting ranges of pixel values in grayscale and color images
   particle filtering functions to filter objects based on shape measurements The term "image processing" may also include functions for performing various types of image analysis, including:
   a histogram function that counts the total number of pixels in each grayscale value and graphs it
   a line profile function that returns the grayscale values of the pixels along a line drawn through the image with a line tool and graphs the values
   particle analysis functions that computes such measurements on objects in an image as their areas and perimeters
   a 3D view function that displays an image using an isometric view in which each pixel from the image source is represented as a column of pixels in the 3D view, where the pixel value corresponds to the altitude.

The term "image processing" may also include functions useful in machine vision applications, including:
   an edge detection function that finds edges along a line drawn through the image with a line tool
   a pattern matching function that locates regions of a grayscale image that match a predetermined template
   a shape matching function that searches for the presence of a shape in a binary image and specifies the location of each matching shape
   a caliper function that computes measurements such as distances, areas, and angles based on results returned from other image processing functions
   a color matching function that quantifies which colors and how much of each color exist in a region of an image and uses this information to check if another image contains the same colors in the same ratio It is noted that the image processing functions listed above are exemplary only and that, in various embodiments of an image processing prototyping environment, other types of image processing functions or operations may be supported.

The user interface of the image processing prototyping environment may enable the user to load or select an image and easily select image processing functions to apply to the image. One element illustrated in FIG. 10 is labeled as a "reference window". FIG. 10 also illustrates a "processing window". As the user applies various image processing functions to the loaded image, the processing window may display the resulting image, while the reference window displays the original unmodified image. The user may select an image processing function to apply by choosing the desired function from a menu bar or by clicking on an icon, etc.

The FIG. 10 user interface also illustrates a "script window". Each image processing function that the user applies to the image may be displayed in this script window. The image processing operations that a user applies to an image may result in a script of image processing operations specifying an algorithm that can be applied to analyze or manipulate other images. As an example, FIGS. 11–17 illustrate a process of developing an image processing script useful for "blob analysis". It is noted that the image prototyping environment may be configured to automatically generate the script described below, if desired.

A "blob" (Binary Large OBject) is a connected region or grouping of pixels in an image in which all pixels have the same intensity level. In a binary image, the background is zero, and every non-zero pixel is part of a binary object. Finding the size, number, or location of blob regions in an image may be useful for many applications, such as detecting flaws on silicon wafers, detecting soldering defects on electronic boards, locating objects in motion control applications, etc.

Figure 11:
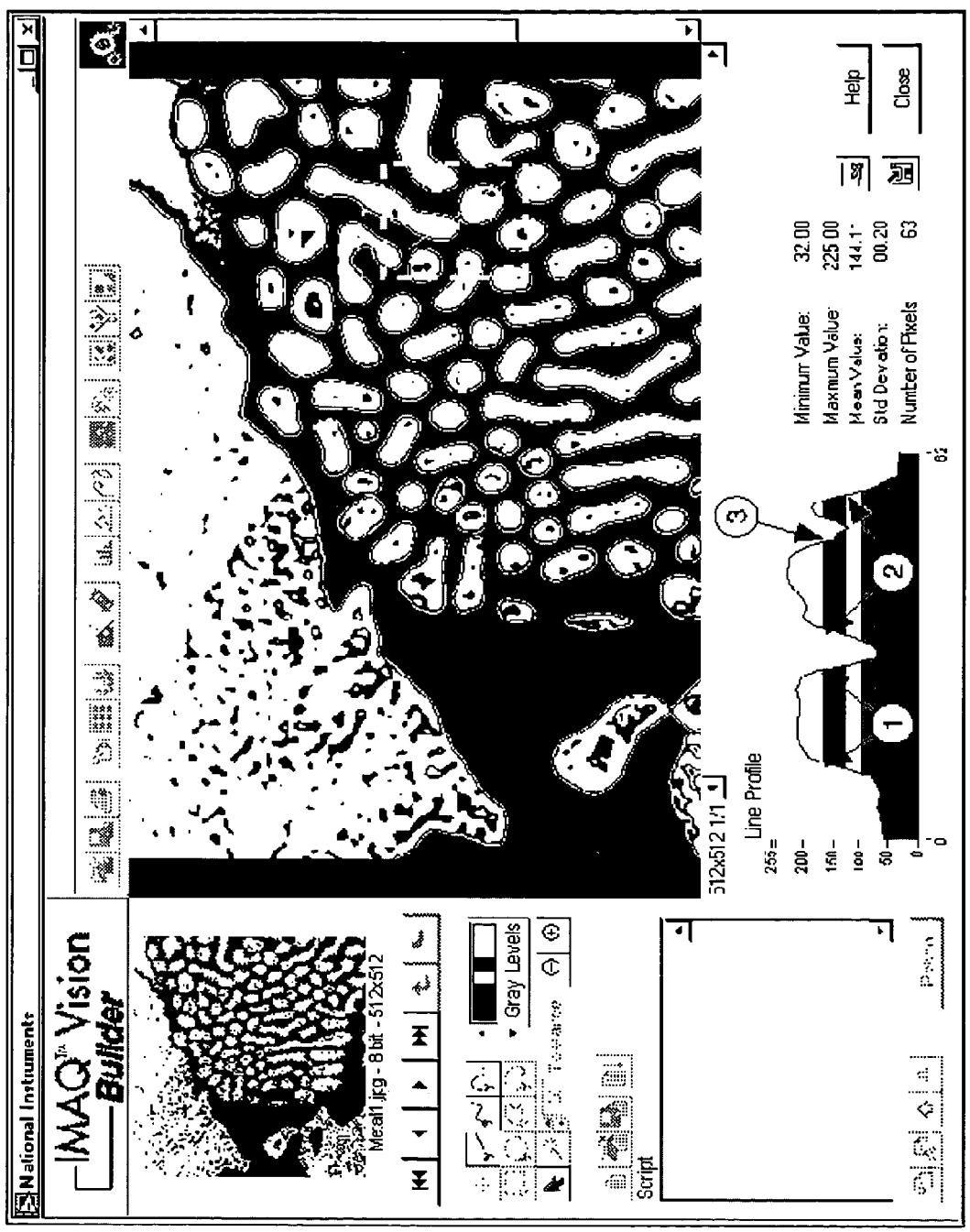
FIGS. 11–17 are screen shots illustrating a process of developing an image processing script useful for "blob analysis"

FIG. 11 illustrates an image for which the user desires to perform blob analysis. In FIG. 11, the user has selected a line profile tool and has drawn a straight line through a portion of the image in the processing window. A rectangle in the processing window indicates the location of this line. In response, the image processing prototyping environment displays grayscale values of the line drawn with the line profile tool, such as the minimum and maximum pixel values, in the bottom of the window. Note that details regarding the image processing functions applied in FIGS. 11–17 are omitted. For background information on image processing in general or the particular image processing functions referred to herein, please refer to available literature, such as the *IMAQ Vision User Manual*, available from National Instruments Corporation.

Figure 12:
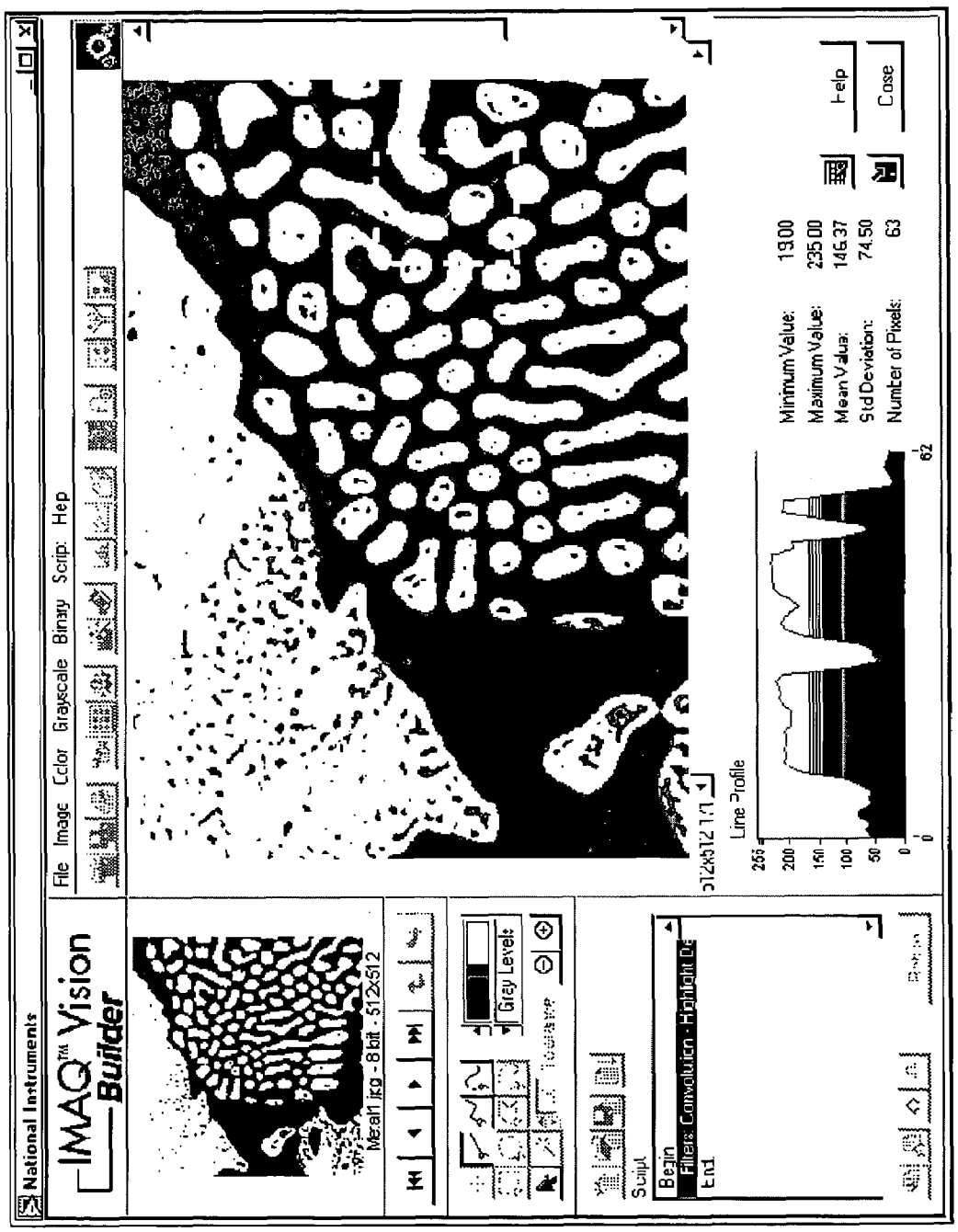

Based on the line profile grayscale values shown in FIG. 11, the user may then apply a filter to the image, e.g., to sharpen edges in the image and to create contrast between the particles and the background. The image processing prototyping environment may provide various types of filters that may be applied, e.g., by selecting the desired filter from a menu bar. FIG. 12 illustrates the resulting image after the user has applied a "Convolution—Highlight Details" filter to the original image. Due to this filter operation, the FIG. 12 image appears to be sharper than the original image. Note that the filtering operation the user applied is recorded in the script window of FIG. 12. Note also that the grayscale values of a line drawn with the line profile tool have changed from the values shown in FIG. 11.

The next step the user may want to perform in the blob analysis is a thresholding operation to separate the particles from the background. A thresholding operation converts the grayscale image to a binary image, keeping the pixels of interest and removing the remaining pixels. The FIG. 13 processing window illustrates the results of applying a thresholding operation in which pixels with a value of 130 to 255 are kept and other pixels are removed. The thresholding operation applied to the image is recorded in the script window of FIG. 13.

It is noted that for each type of image processing function supported, the image processing prototyping environment may be operable to display intermediate windows or screens that the user interacts with. These intermediate windows or screens may enable the user to specify various parameters or settings that apply to a particular image processing function. When the image processing function is added to the script, the specified parameters may be associated with the image processing function. The parameters may then be used when generating the desired program to implement the image processing algorithm, as described below. It is noted that various image processing functions may have output parameters as well as input parameters.

The process of developing an image processing algorithm may typically involve experimenting with various image processing functions and settings for the functions. However, FIGS. 11–17 omit such intermediate states and simply illustrate the result of applying each step in the algorithm to the image. For example, when performing a threshold operation, an intermediate screen such as shown in FIG. 14 may appear. FIG. 14 illustrates a selection box enabling the user to select the particular type of threshold operation to apply and illustrates an interactive graph with minimum and maximum threshold values that the user may adjust in order to find the desired threshold pixel values to use. When the threshold operation step is added to the script, the specified minimum and maximum values may be associated with the step.

Figure 13:
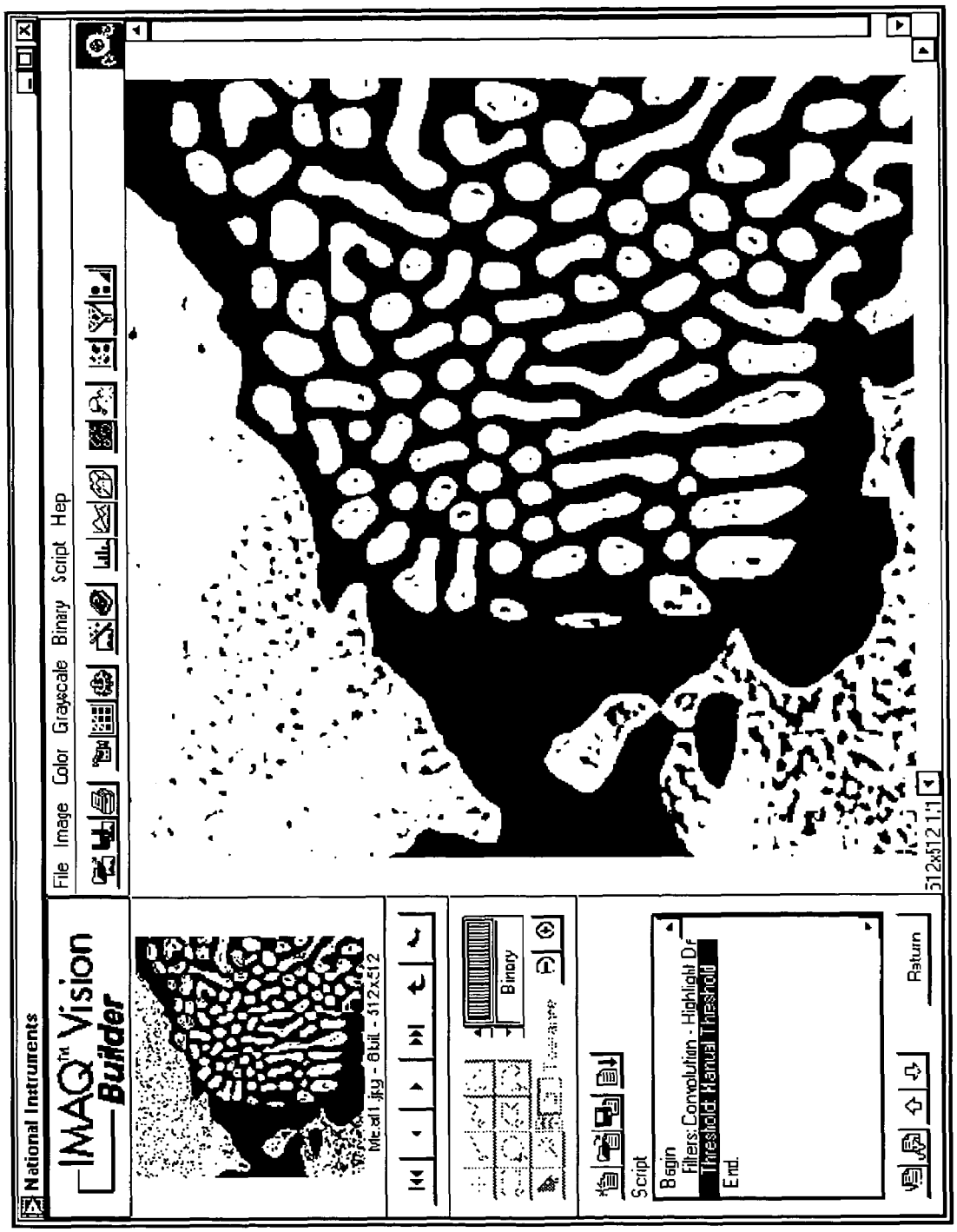
Figure 14:
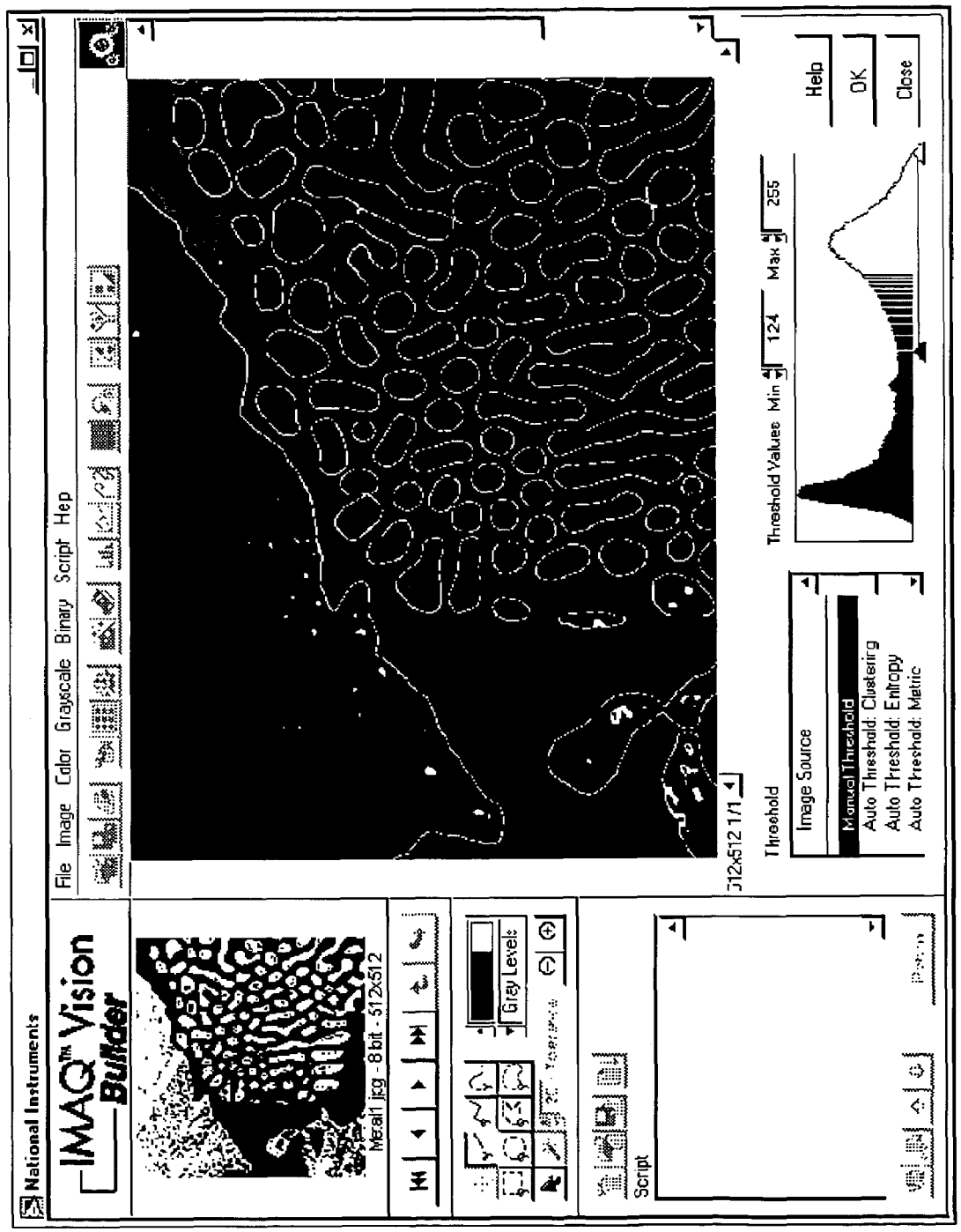
Figure 15:
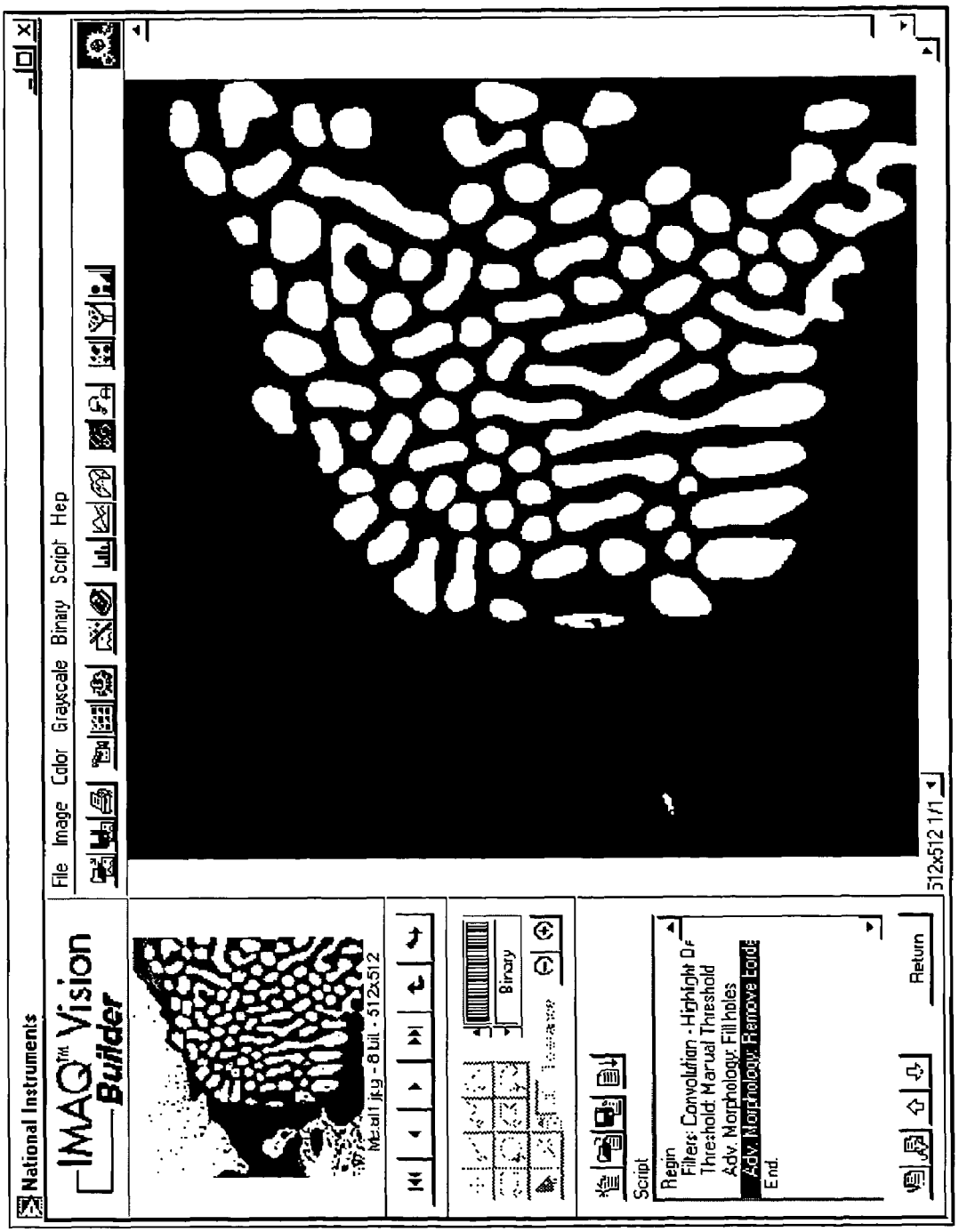
Figure 16:
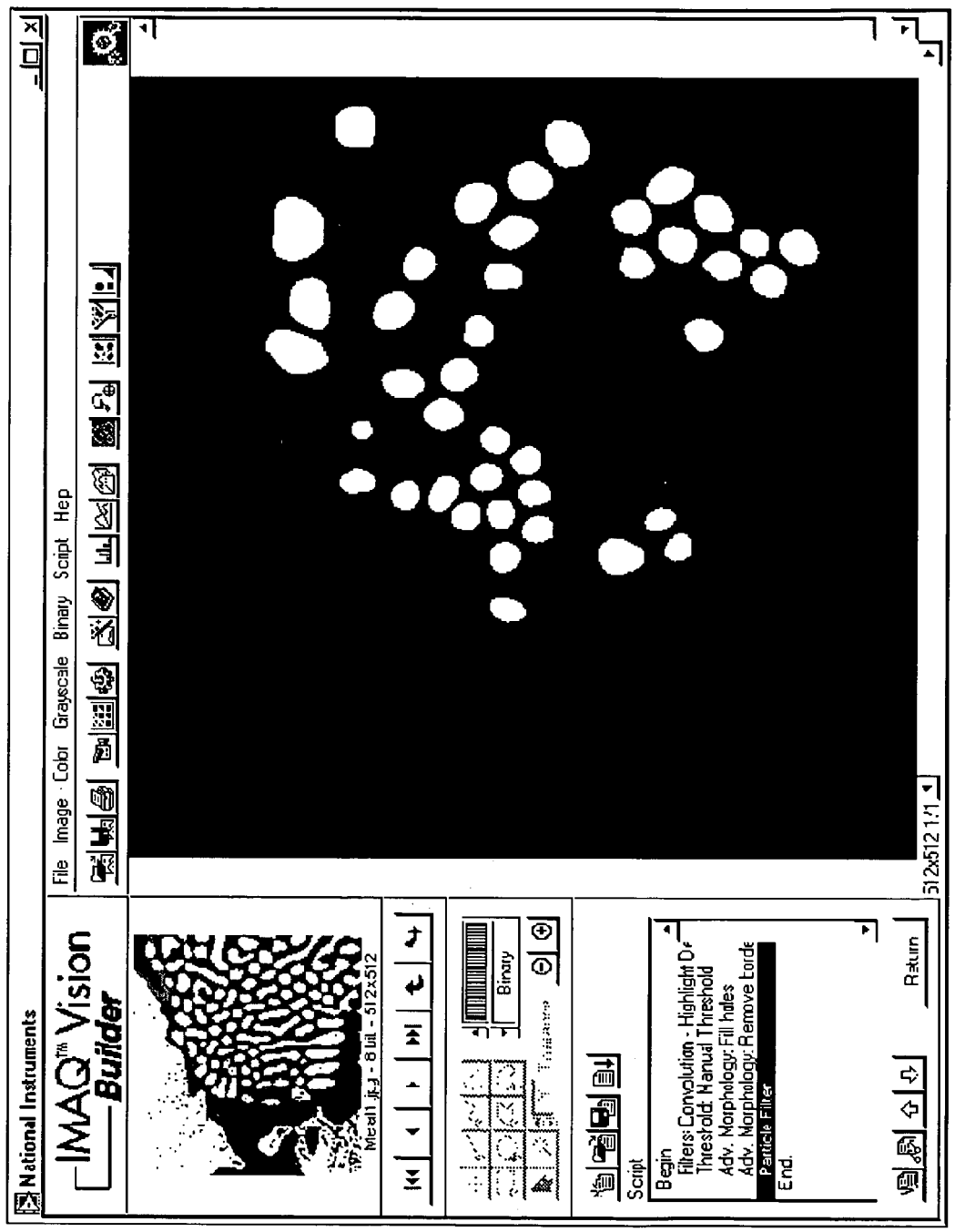

Continuing with the blob analysis example, after the thresholding operation is applied, the FIG. 13 binary image is obtained. The FIG. 13 particles are referred to as blobs. The user may then apply morphological functions to the image, where the morphological functions affect each blob on an individual basis. The FIG. 15 processing window illustrates the results of applying two successive morphological functions to the image: a "Fill Holes" function to fill holes in the particles, and a "Remove Border Objects" function to remove objects that touch the border of the image. These morphological functions are also displayed in the FIG. 15 script window.

The user may next want to apply a particle filter function which isolates and keeps the circular blobs and removes the non-circular blobs from the image. The FIG. 16 processing window illustrates the results of applying such a particle filter. The particle filter operation is displayed in the FIG. 16 script window.

Figure 17:
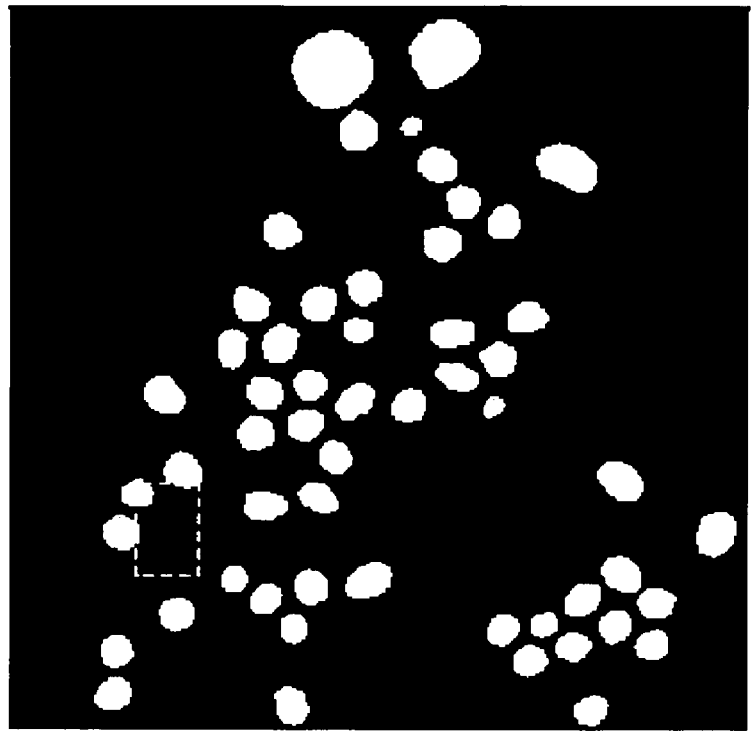
Figure 17:
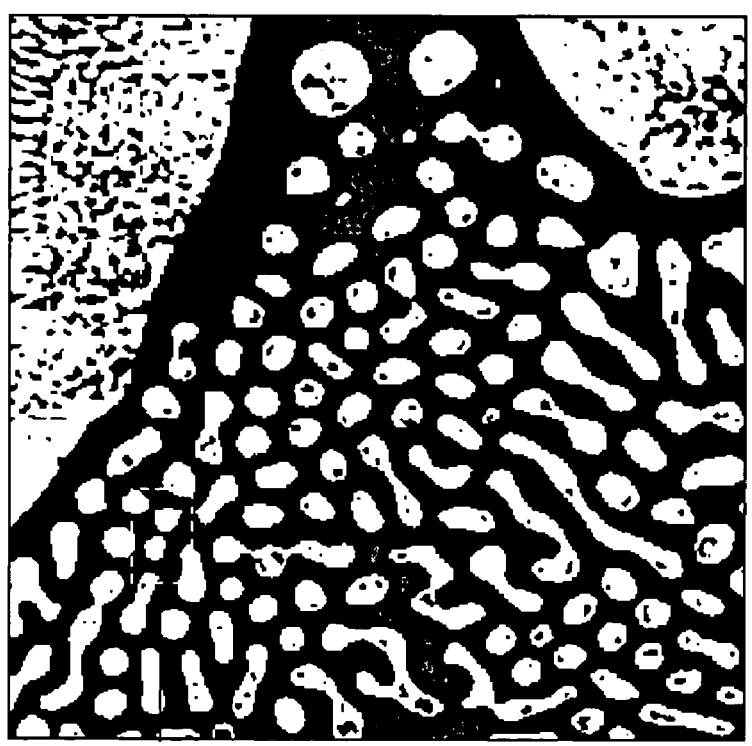

Once the user has developed the desired image processing algorithm in the image processing prototyping environment, the user may test the algorithm on other images. As described above, a script describing each step of the algorithm may be recorded, and the prototyping environment may be operable to "replay" this script on other images. For example, FIG. 17 illustrates an original image (Metal3.jpg) and the image that results from applying the script described above for FIGS. 11–16. Notice that the resulting image is similar to the FIG. 16 result, in which circular blobs are isolated. Of course, the blob analysis algorithm discussed above is exemplary only, and image processing algorithms to perform any of various other types of image processing, manipulations, or analyses may be developed.

FIGS. 18–23: Requesting a Graphical Program to be Generated from a Script

As described above, after requesting the image processing prototyping environment to automatically create a prototype, the user may modify the prototype, e.g., by adding or removing image processing functions, modifying function parameter values, etc. In this way, the user may customize the automatically created prototype to perform an image processing algorithm solving the user's particular problem. Once the user has developed and tested an image processing algorithm in the image processing prototyping environment, the prototyping environment may be operable to automatically generate a program to perform the algorithm. In one embodiment, a graphical program may be automatically generated, as described below. It is noted that, in various embodiments, a prototype automatically created by a prototyping environment may itself be a computer program, making it unnecessary to generate a program implementing a prototype solution.

It may be desirable to automatically generate a program to implement a prototype solution for several reasons. For example, as described above, a prototyping environment generally enables users to quickly and easily create prototype solutions targeted toward solving specialized problems in one or more fields or disciplines. However, there is often a tradeoff between specialization/ease-of-use and the ability to create customized solutions to a problem. For example, a user may desire the ability to enhance a solution with features that are not provided by the prototyping environment used to create the solution. Also, a solution created using a given prototyping environment usually may be run within that prototyping environment. However, it may be desirable to instead export the solution into other environments. Generating a computer program to implement the prototype solution may enable the user to integrate the solution with other applications or processes.

Figure 18:
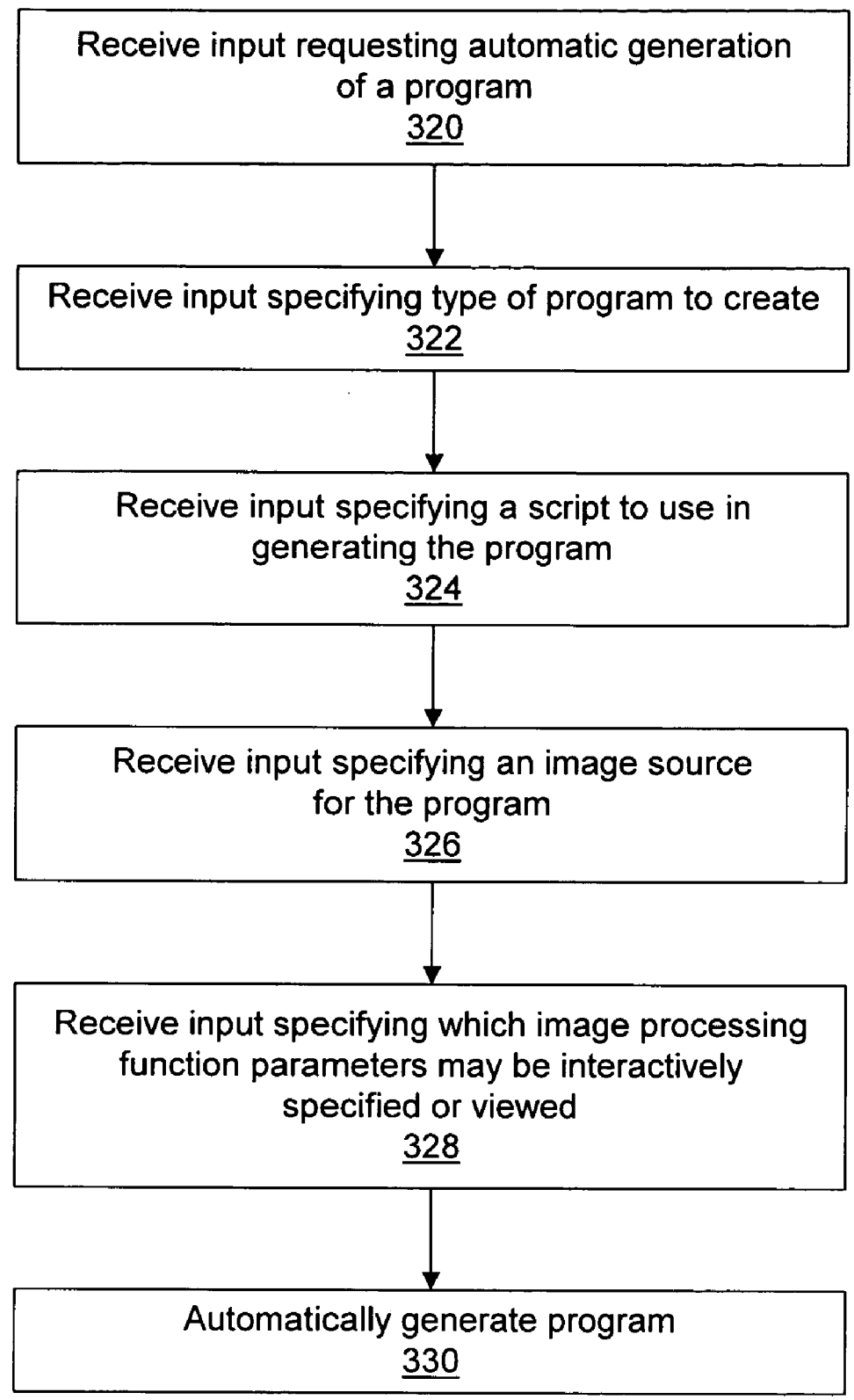
FIG. 18 is a flowchart diagram illustrating one embodiment of a method for receiving information to be used in automatically generating a graphical program, e.g., in order to automatically generate a graphical program implementing an automatically created prototype.

FIG. 18 is a flowchart diagram illustrating one embodiment of a method for receiving information to be used in generating the program. In one embodiment, a code generation "wizard", i.e., a series of related user interface dialogs, may be employed to receive the information described in FIG. 18. FIGS. 19–23 illustrate an example of such a code generation wizard.

In step 320 of FIG. 18, input requesting automatic generation of a program is received, e.g., interactively or programmatically. For example, once the user has developed a script as described above, the user may then issue a command to generate a program from the script.

As described above, in various embodiments, any of various types of graphical programs may be generated to implement the image processing algorithm. In step 322, input specifying a type of graphical program to create may be received. The input received in step 322 may specify a particular graphical programming language to use in generating the graphical program and/or may specify a particular graphical programming development environment where the generated program will be used. If a particular graphical programming development environment is specified in step 322, the generated graphical program may utilize proprietary programming or development features, or may adhere to proprietary requirements, of that specified graphical programming development environment. It is noted that in an alternative embodiment, the prototyping environment may only be operable to generate one default type of graphical program, and thus step 322 may not be performed.

Figure 19:
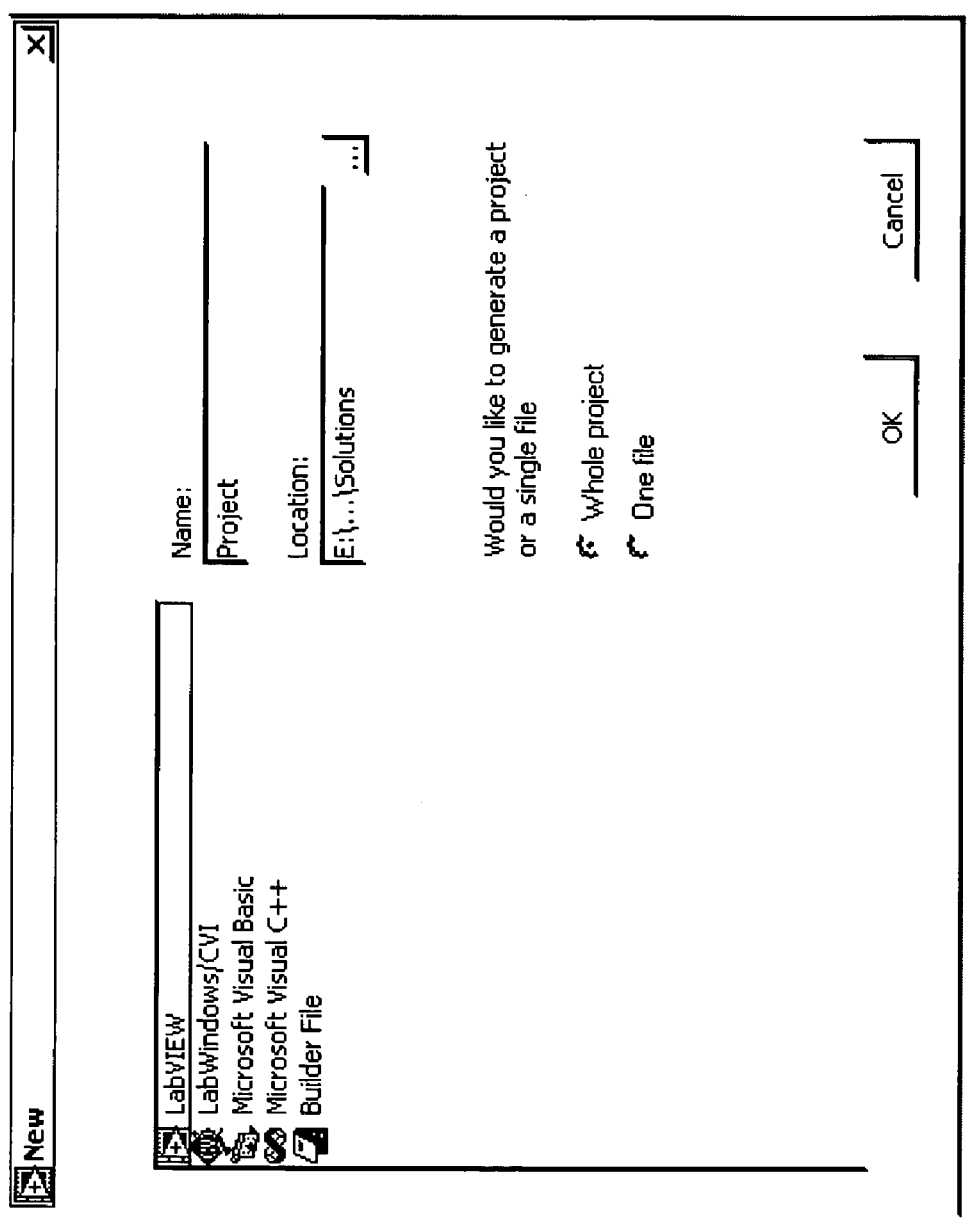
FIG. 19 illustrates a user interface for receiving information specifying a graphical program type to create.

FIG. 19 illustrates a user interface for receiving information specifying a program type to create. A selectable list of various programming development environments is shown. In the embodiment shown in FIG. 19, the list includes a graphical programming development environment, LabVIEW, as well as various text-based programming environments, including LabWindows/CVI, Microsoft Visual Basic, and Microsoft Visual C++. In alternative embodiments, any of various other graphical or text-based programming languages or development systems may be supported.

As shown in FIG. 19, a user may also specify whether to generate additional files or other elements associated with the generated program. For example, many graphical programming development environments utilize proprietary file types, such as project files that specify information or settings for an application. For an embodiment supporting such programming development environments, the user may specify whether to generate only the file(s) implementing the program or to also generate a project file or other relevant files associated with the program.

Figure 20:
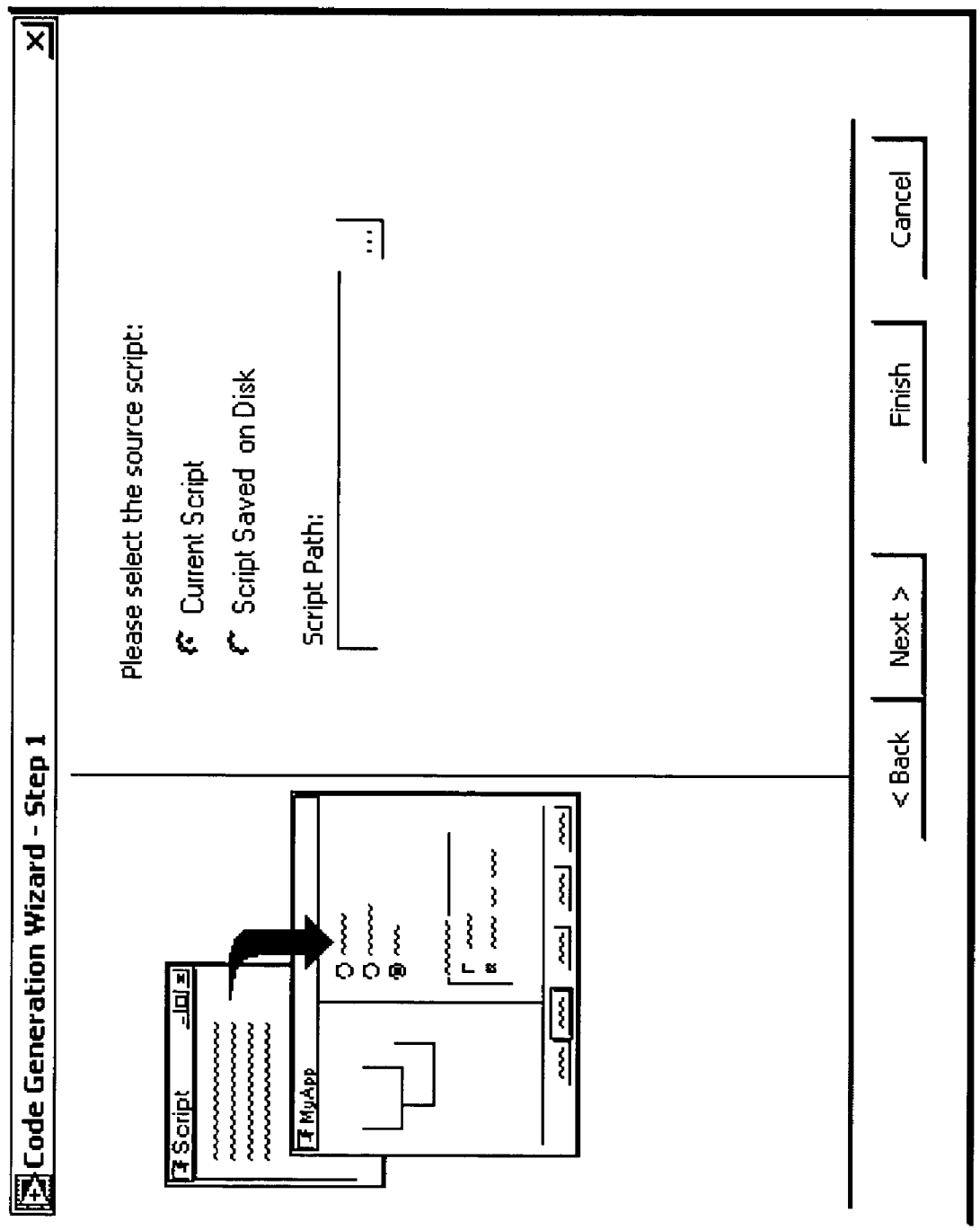
FIG. 20 illustrates a user interface for receiving information specifying a particular script to use in generating a graphical program.

In step 324, input specifying a particular script to use in generating the graphical program may be received. For example, a script developed as described above may be saved to a script file, which is then specified in step 324. Alternatively, a current script, i.e., a script that is currently open or in use, may be specified. FIG. 20 illustrates a user interface for receiving the information of step 324. In one embodiment, the current script is automatically used in generating the program.

Figure 21:
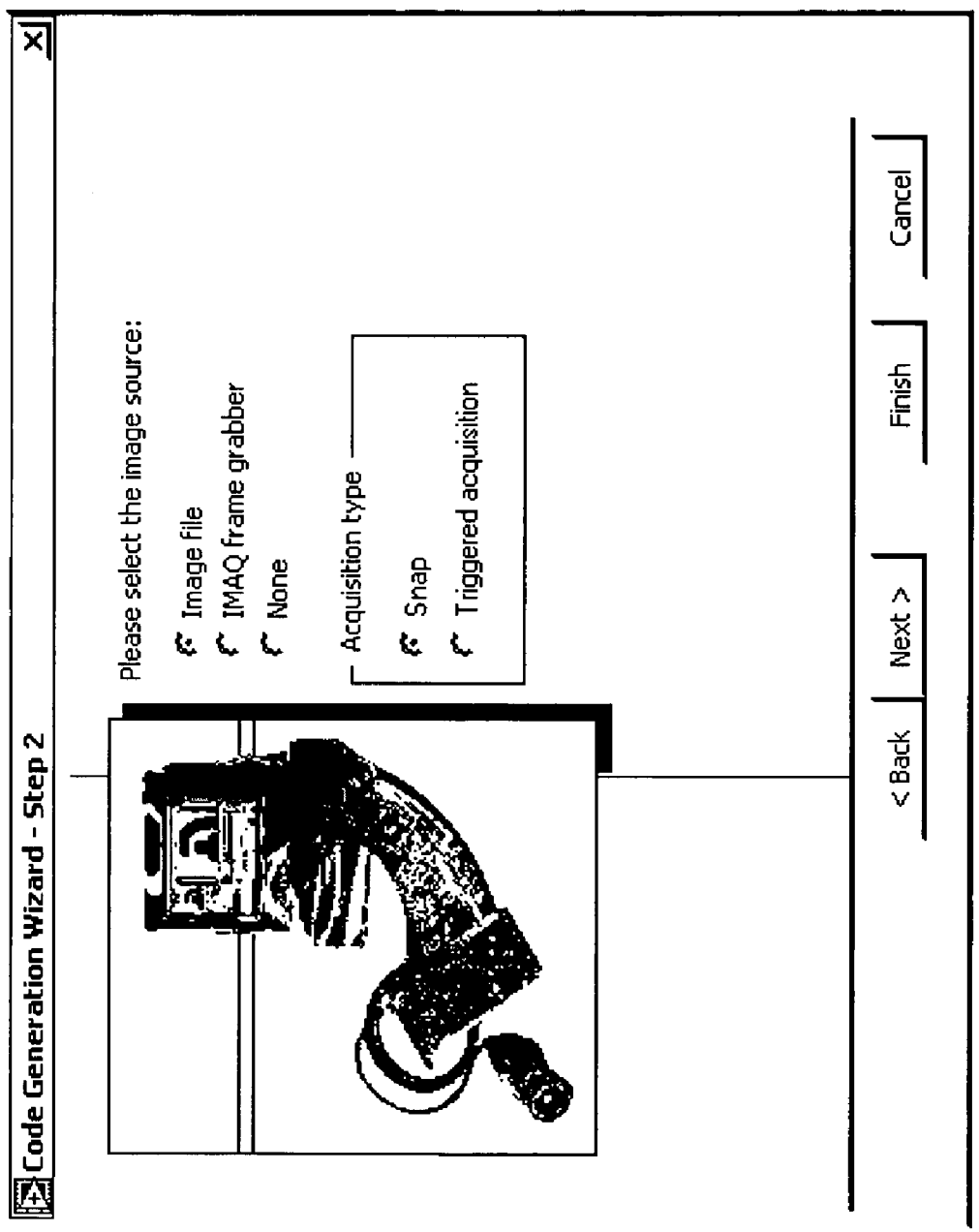
FIG. 21 illustrates a user interface for specifying an image source type for a graphical program.

In step 326, input specifying an image source or type of image source for the program may be received. In one embodiment, the generated program may perform different operations, depending on the type of image source. For example, if the image source is an image file, the graphical program may include code for opening the file, extracting the image from the file, etc. If the image source is a hardware device, the graphical program may include code for initializing the hardware device, acquiring the image from the device, etc. FIG. 21 illustrates an exemplary user interface for specifying an image source type. In this example, either an image file or a framegrabber hardware device may be specified. As shown in FIG. 21, if the image source is a hardware device, various parameters relating to the device, e.g., snap or triggered acquisition may also be specified in step 326.

In step 328, input specifying which image processing function parameters may be interactively specified or viewed may be received. As described above, each particular image processing function may have associated input and/or output parameters or settings. When developing the script, the user may set the input parameter values for each step as desired, and the desired parameter values may be associated with the image processing function when the function is added to the script. The input parameter values may then be used to generate a program that operates as desired. In one embodiment, the parameter values are automatically hard-coded into the program and cannot be changed without modifying the program code. However, the user may desire the ability to interactively change one or more of the input parameter values during program operation and/or view one or more output parameter values. Thus, in the preferred embodiment, the user can specify which input parameter values may be interactively specified or which output parameters may be viewed. The generated graphical program is then operable to accept program input specifying new values for the chosen input parameters during program operation and is operable to provide program output displaying the chosen output parameters. For example, in one embodiment, a graphical user interface panel including various user interface controls and indicators allowing the user to set the input parameter values and view the output parameter values may automatically be displayed when the graphical program executes.

Figure 22:
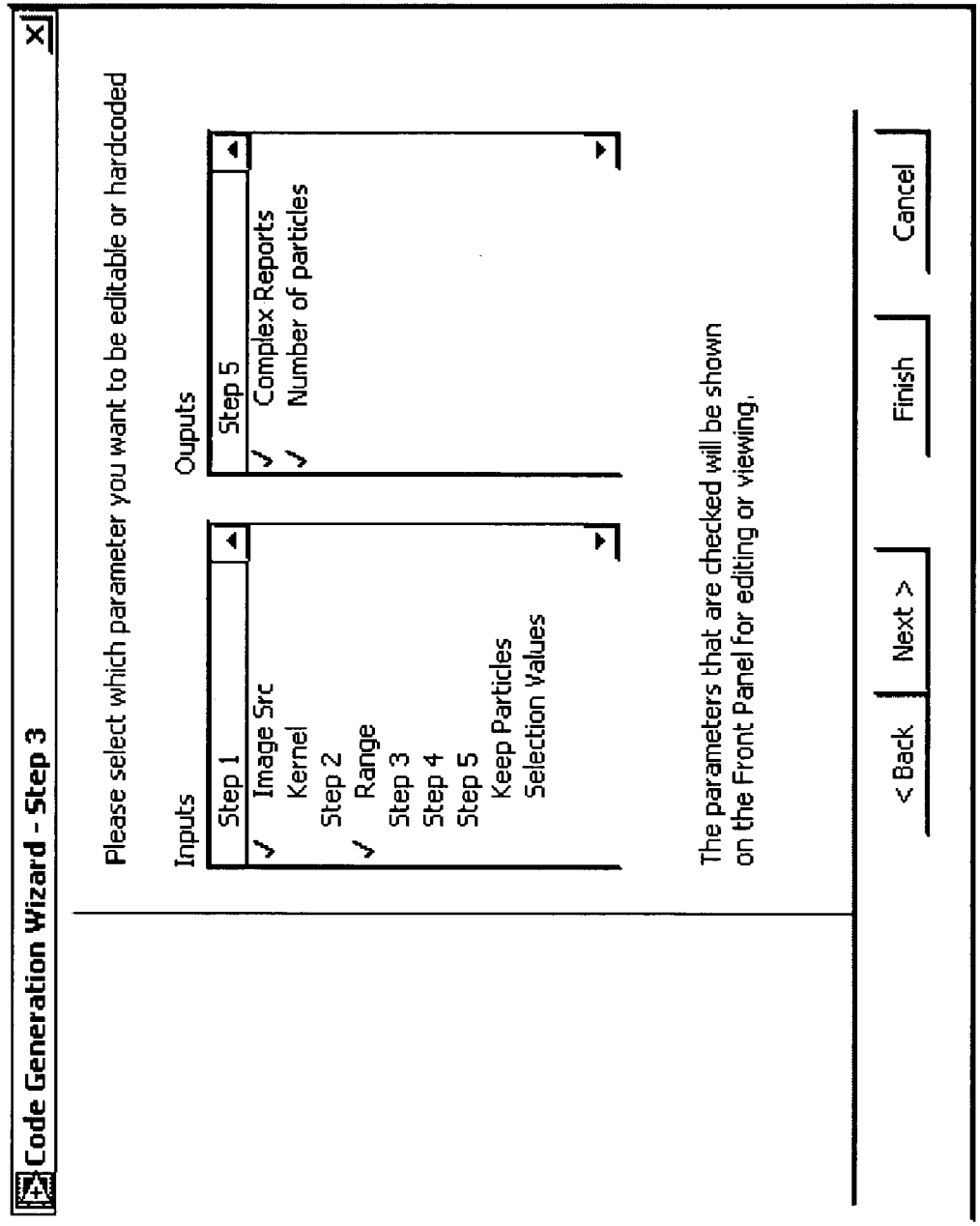
FIG. 22 illustrates a user interface for specifying input and output parameters for a graphical program that are desired to be interactively changeable or viewable.
Figure 26:
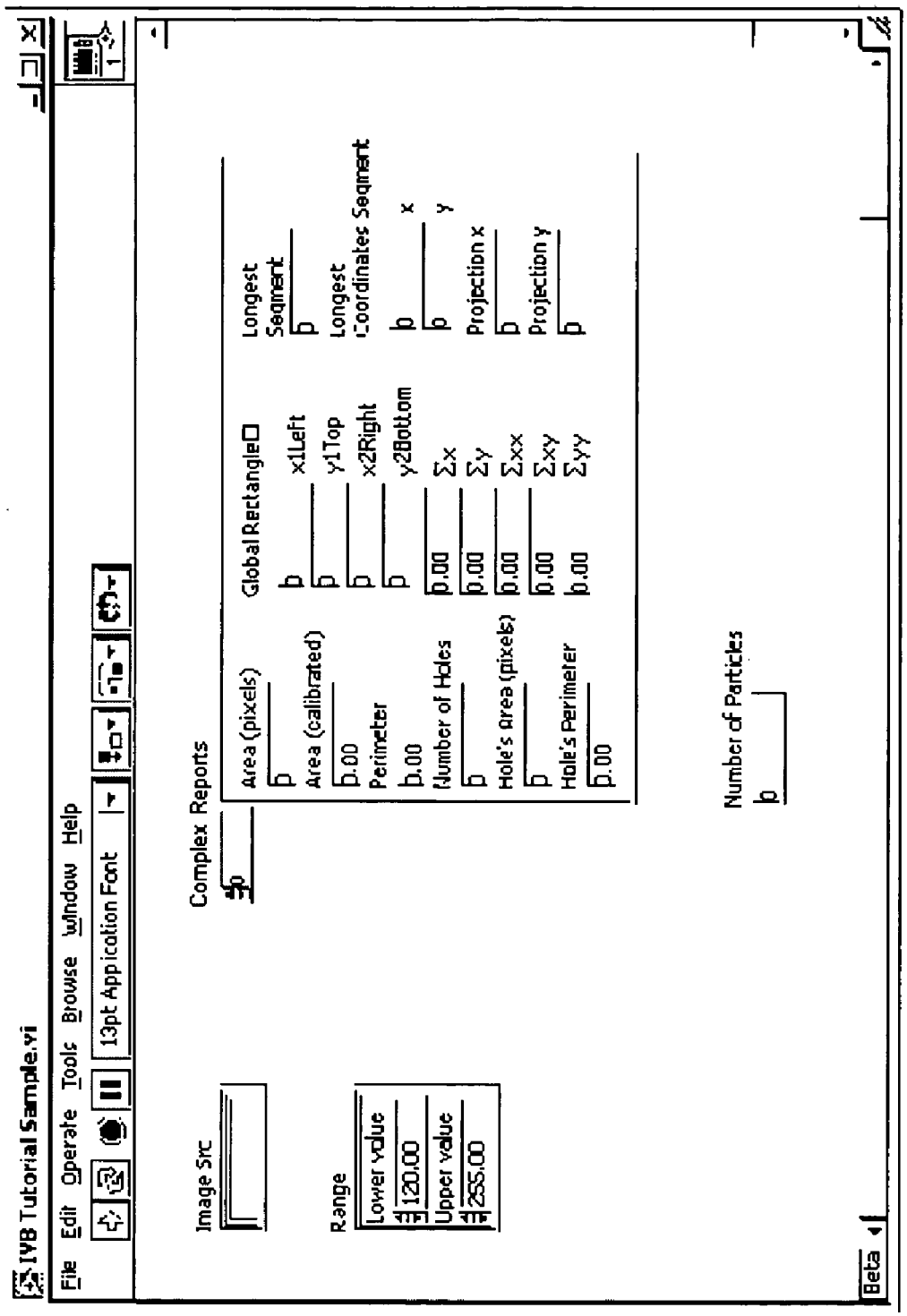
FIG. 26 illustrates a user interface panel including user interface controls and indicators for specifying input parameter values and displaying output parameter values for the graphical program of FIG. 25.

FIG. 22 illustrates a user interface for receiving input specifying the input and output parameters that are desired to be interactively changeable or viewable. The items displayed in FIG. 22 correspond to the final script shown in the script window of FIG. 16. As shown, the user interface may divide the items into input or output parameters and subdivide each group to illustrate which step of the script the items correspond to. For example, as discussed above with reference to FIG. 14, step 2 of the script, a threshold operation, may utilize input parameters specifying minimum and maximum threshold values. The user interface shows an item labeled "Range" which corresponds to these input parameters. The user may place a check beside each input parameter desired to be interactively changeable and beside each output parameter desired to be interactively viewable. FIG. 26, discussed below, illustrates a user interface panel with user interface controls and indicators corresponding to the selected input and output parameters, respectively.

In step 330, the graphical program is automatically generated, using the information received in steps 322–328. Step 330 may be performed in any of various ways as appropriate for a particular graphical programming language or graphical programming development environment. For example, each step recorded in a script may correspond to a particular function node or group of function nodes, and the prototyping environment may create a graphical program that includes the appropriate nodes. In various embodiments, additional elements may also be included in the created graphical program. For example, as described above, the created program may include nodes operable to load or acquire an image, display the image, etc.

Figure 23:
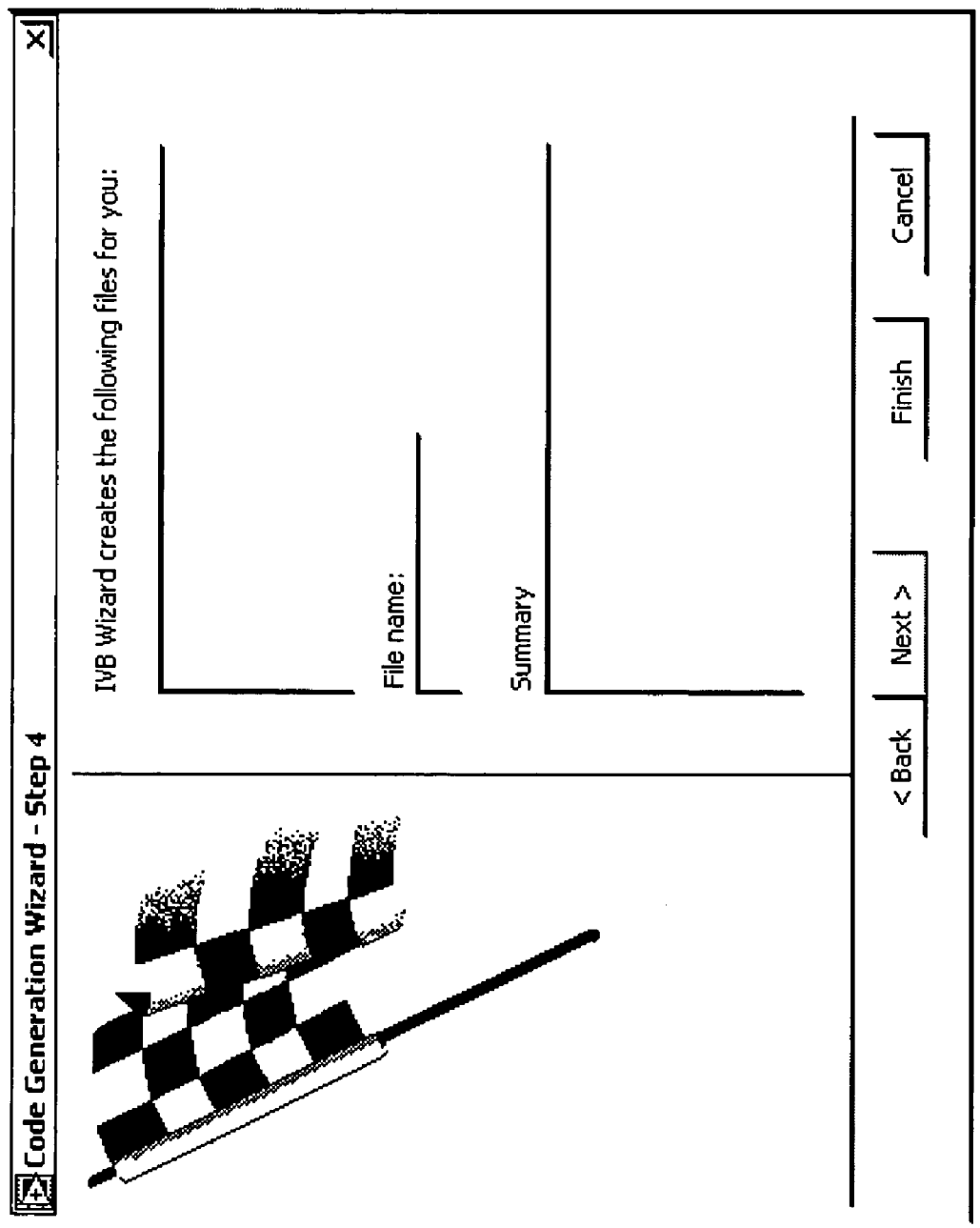
FIG. 23 illustrates a user interface for specifying a file name for a program file.

One or more files including graphical program code may be generated in step 330. FIG. 23 illustrates a user interface for receiving input specifying a file name for a program file. Also, as described above, step 330 may comprise generating other files, e.g., project files, in addition to the file(s) specifying the program code.

As noted above, the flowchart of FIG. 18 represents one embodiment of a method for receiving information to be used in generating a program, and various steps of FIG. 18 may be added, omitted, reordered, combined, etc. For example, the method may receive additional input in addition to that described above, to be used in generating the program. This additional input may pertain, for example, to a particular graphical programming development environment that is supported, and/or may serve to enhance the functionality described above. As one example, additional input regarding the image source for a program may be received, e.g., to specify a particular default image file name.

Maintaining an Association Between a Script and a Generated Program

In one embodiment, an association between the script created in the prototyping environment and the program generated from the script may be maintained. This association may enable a user to run the automatically generated program and then return to the prototyping environment in order to view or edit the script used to create the program. The ability to return to the prototyping environment may be useful, for example, if while using the program to process images, it is discovered that the program has an error or needs to be modified for other reasons.

The association between the script and the generated program may be implemented in any of various ways. For example, in one embodiment, a program file may be enabled to store information related to the program; thus, the script information may be stored in the program file when the program is created. In another embodiment, the script information may be stored in another file associated with the program, such as a project or resource file. In another embodiment, the prototyping environment may be operable to store the script information. For example, when the program is created, the prototyping environment may determine or receive a key usable for uniquely identifying the program, and this key may later be used by the prototyping environment to retrieve the script information used to create the program. In another embodiment, information specifying the script used to create the program may not be maintained, but rather, the prototyping environment may be operable to read the graphical program and automatically re-create the script used to create the program.

In various embodiments, a user may perform any of various actions in order to return to the prototyping environment to view or edit the script associated with a program. For example, the graphical program may be a program associated with a graphical programming development environment that is coupled with the prototyping environment, and the user may be able to automatically return to the prototyping environment by issuing a command to the graphical programming development environment, e.g., by selecting a menu item. In another embodiment, the user may first view the user interface for the prototyping environment and then select the script corresponding to the program.

In one embodiment, a program created from a script may be "locked". While the program is locked, the user may be prevented from modifying the program. The ability to lock the program may be useful, for example, in order to ensure that the state of the program corresponds to the state of the script used to create the program when the user returns to the prototyping environment. If the user desires to modify the program, the user may unlock the program, e.g., by selecting an option in a development environment associated with the program. The mechanisms of locking and unlocking a program may be implemented in any of various ways, according to methods supported by a particular system or graphical programming environment.

Figure 24:
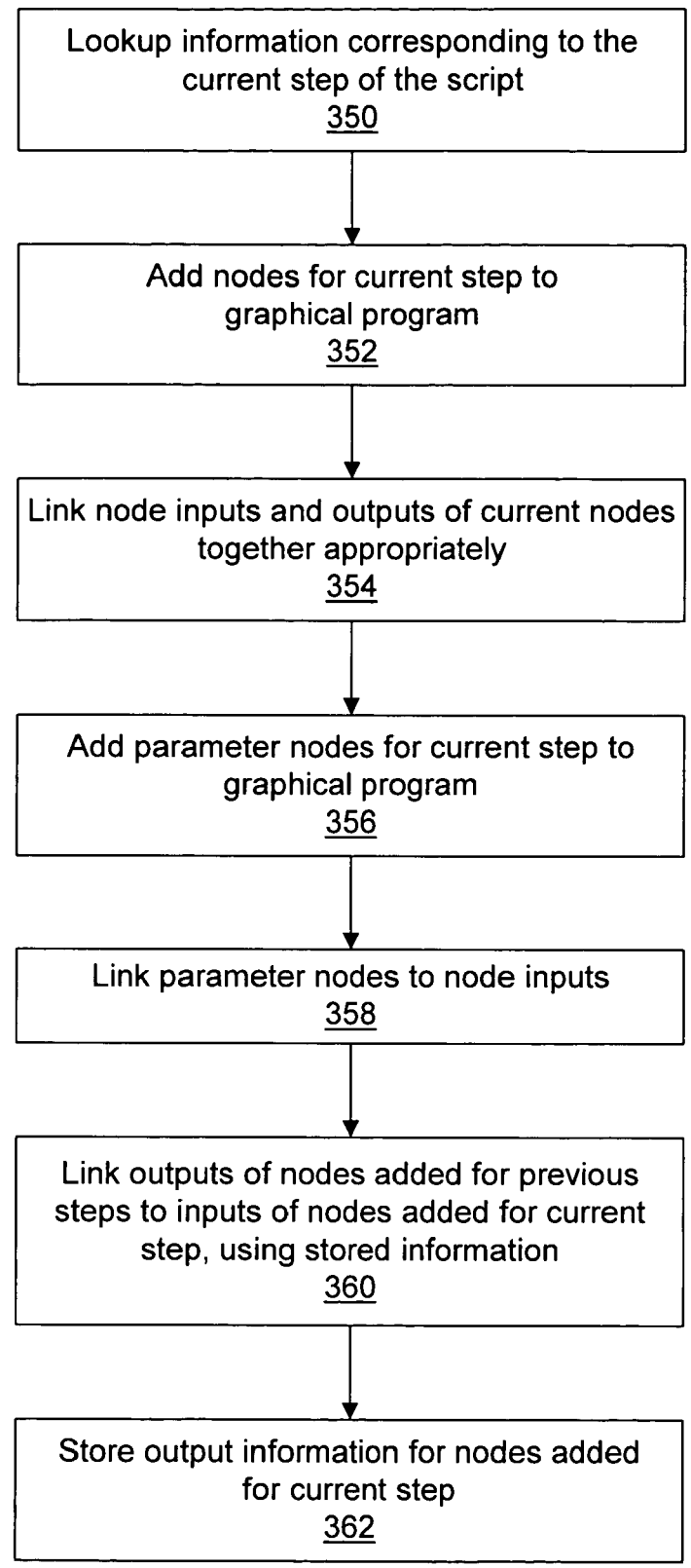
FIG. 24 is a flowchart diagram illustrating one embodiment of a process of programmatically generating a graphical program from a script.

FIG. 24—Automatic Graphical Program Generation

FIG. 24 is a flowchart diagram illustrating in detail one embodiment of automatically generating a graphical program from a script, as discussed above with reference to step 330. As described above, the script may include a number of steps, where each step represents a particular function. FIG. 24 illustrates a method that may be performed for each step in the script, in order to generate graphical program code corresponding to the script step. It is noted that various steps of FIG. 24 may be combined, reordered, altered, omitted, etc.

Step 350 of FIG. 24 is to lookup information corresponding to the current step of the script, e.g., from a database. For example, each possible function step that can appear in a script may have a corresponding key, such as the function name, that may be used to lookup the information.

A graphical program diagram may comprise nodes which are connected together to model the program data flow or control flow, where various nodes represent different functional blocks. For each function step of a script, the step may be implemented in a graphical program using one or more nodes that are connected to each other appropriately. For example, FIG. 12 illustrates a convolution filter function step in the prototyping environment script window. This convolution filter function may correspond to a single node available in a graphical programming system, wherein the node implements the convolution functionality. Alternatively, the convolution filter function may be implemented using a plurality of graphical program nodes. The graphical program nodes may be any of various types of nodes supported by a particular graphical programming system, including subprogram nodes, function nodes, etc. In one embodiment, the graphical programming system provides a library of nodes related to the problem domain or field of the prototyping environment, which may be used in implementing steps of the script.

Thus, the information retrieved in step 350 may include a list of one or more nodes to add to the graphical program, in order to implement the current step of the script. The information may also include information specifying how the inputs and outputs of these nodes should be linked to each other, in order to accomplish the desired data or control flow. The link information may be specified in any of various ways, as appropriate for a particular graphical programming system. For example, in one embodiment, each graphical program node includes terminals corresponding to each node input or output. Thus, the link information may specify pairs of node terminals that should be connected to each other.

The information retrieved in step 350 also may include parameter information. As described above, various parameters or settings may be associated with each step in a script. These parameters may be represented in the graphical program as leaf nodes which provide input to or display output from the nodes which implement the current step of the script. Thus, the parameter information may include a list of leaf nodes to add to the graphical program, in order to provide or accept the parameter values to or from the other nodes. A type may be specified for each parameter. For example, if an input parameter is an integer value, a corresponding leaf node may be created as an integer constant node, i.e., a node which is operable to output an integer constant. A default value for the parameter may also be specified. For input parameters, information specifying which node input the output of the corresponding leaf node should connect to may also be specified. For output parameters, information specifying which node output the input of the corresponding leaf node should connect to may also be specified.

As discussed above, in one embodiment, the user may designate certain parameter values that he wishes to be able to change or display interactively. For these parameters, a leaf node constant representing the parameter value is preferably not connected to the node input/output that receives/generates the parameter value. Instead, a user interface control or indicator representing the parameter value may be created, and the node input or output that receives or generates the parameter value may be configured to receive or set the value of this user interface control or indicator. In one embodiment, when a user interface control or indicator is created, a corresponding node may be automatically created in the graphical program diagram. Thus, the output or input of the node corresponding to the user interface control/indicator may simply be connected to the node input or output that receives or generates the parameter value. For other embodiments, the node input/ouput may be connected to the user interface control/indicator value in any of various other ways, as supported by the particular embodiment.

The parameter information obtained in step 350 may include information specifying the type of user interface control/indicator to create and possibly other user interface information. For example, for a parameter that may be one of several strings, the parameter information may specify that a user interface control for selecting from a list of strings should be created and may specify the list of strings to configure the control with. Alternatively, the system may be operable to automatically create an appropriate user interface control or indicator by examining the type information of the node input or output that control or indicator connects to. This automatic creation of user interface controls/indicators is discussed below.

In step 352, the nodes determined in step 350 are added to the graphical program. Elements may be added to the graphical program in any of various ways. For example, the application that generates the graphical program may comprise program logic for creating a graphical program file that is formatted appropriately. However, in the preferred embodiment, the application interfaces with a graphical programming system and requests the graphical programming system to create the desired program. Interfacing with a graphical programming system is discussed below.

In step 354 the inputs and outputs of the nodes added in step 352 are linked to each other appropriately, using the information from step 350. Again, the application may perform step 354 directly or may request a graphical programming system to connect the node inputs and outputs.

In step 356, nodes representing parameters to the functions for the current step of the script are added to the graphical program, using the information from step 350. For example, various leaf nodes may be added, as described above. In step 358, the outputs of the parameter nodes are connected to the appropriate inputs of the nodes added in step 352. Step 356 may also involve configuring the leaf nodes with an appropriate value. As noted above, when a step is added to a script, parameter values specified by the user (or default values) may be associated with the step. These parameter values may be used to configure the leaf nodes with an appropriate value. For example, in FIG. 14, a maximum threshold parameter value of 255 is illustrated. In this example, a leaf node representing the maximum threshold parameter may be created as an integer constant and may configured with a value of 255. Thus, this leaf node would provide the value 255 to the node input that the leaf node is connected to. For a parameter that is interactively changeable, steps 356 and 358 may involve creating a user interface control for the parameter and linking the control to the appropriate node input, as described above.

Steps 350–358 describe adding graphical program elements pertaining to a particular step of the script to the graphical program. For a given current step, it may be necessary to link various outputs of nodes added for previous steps to inputs of nodes added for the current step. For each step, information regarding outputs of nodes added for the step may be stored, e.g., in a table in memory. In step 360, this stored information may be used to connect the appropriate outputs of nodes previously added to inputs of nodes added for the current step. For example, in addition to specifying the desired links between nodes added for the current step of the script, the information obtained in step 350 may also specify when an input of a node added for the current step should be connected to an output of a node added for a previous step in the script. The stored information may then be searched to determine which previous node output should connect to the current node input. Any of various types of information enabling this determination may be stored, as appropriate for a particular embodiment, such as output terminal names, output data types, etc.

In step 362, output information relating to nodes added for the current step of the script is stored, so that this information will be available for subsequent steps.

Figure 25:
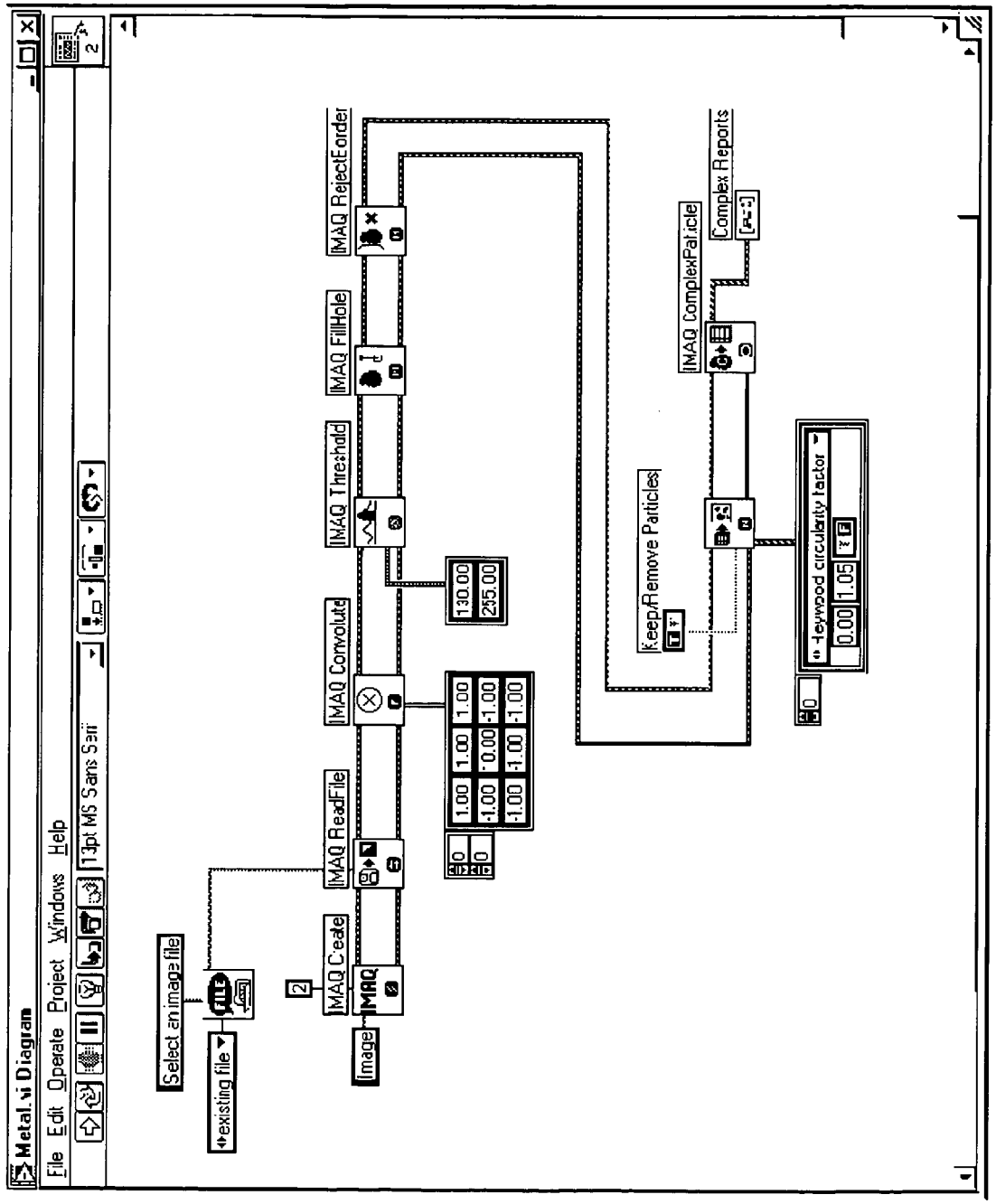
FIG. 25 illustrates an exemplary graphical program that is automatically generated from the image processing algorithm script example discussed with reference to FIGS. 11–17.

FIGS. 25–26: Example of a Generated Graphical Program

FIG. 25 illustrates an exemplary graphical program that is automatically generated from the image processing algorithm script example discussed with reference to FIGS. 11–17. For convenience, the graphical program diagram is grouped into portions, and each portion is labeled in order to illustrate which step of the script the portion implements. As described above, each portion includes one or more nodes which implement the image processing function specified by the corresponding step of the script. For nodes that accept or provide parameter values, the nodes are connected to leaf nodes that provide or accept the parameter values to or from the nodes.

The graphical program of FIG. 25 correspond to the code generation user interface screen shown in FIG. 22, in that the program is operable to accept interactive user input specifying the input parameters selected in FIG. 22 and is operable to display the output parameters selected in FIG. 22. FIG. 26 illustrates a user interface panel including user interface controls and indicators corresponding to the selected input and output parameters. This user interface panel may be generated along with the graphical program block diagram. Each user interface control or indicator on the user interface panel has a corresponding leaf node in the block diagram. For example, the block diagram leaf node labeled "Range" corresponds to the user interface control labeled "Range", and the output of the "Range" leaf node is connected to the input of the "IMAQ Threshold" node, so that the "IMAQ Threshold" node receives the new range values as they are adjusted by a user.

Note that for the parameters which are not selected in FIG. 22, no corresponding user interface controls or indicators are created, and values for these parameters are instead hardcoded into the block diagram. For example, the "Keep Particles" item is unselected in FIG. 22, and a Boolean constant leaf node labeled "Keep/Remove Particles" is connected to one of the nodes which implement step 5 of the script. The constant value may be set to True or False, e.g., depending on the settings the user specified when the script was created.

As noted above, in one embodiment, an appropriate user interface control or indicator for a selected parameter may be automatically created by examining the type information of the node input or output that the control or indicator connects to. For example, as discussed below, the prototyping environment may interface with a graphical programming system and may request the graphical programming system to create each graphical program object. The graphical programming system may be operable to automatically create a user interface control or indicator that matches the data expected by a node input or produced by a node output. For example, with respect to the block diagram node labeled "IMAQ Threshold", the graphical programming system may examine the input terminal of the node and discover that the terminal expects two integer values. The graphical programming system may then create a user interface control appropriate for providing two integer values, such as the "Range" control illustrated in FIG. 26.

Interfacing with a Graphical Programming System

As described above, in one embodiment the prototyping environment may interface with a graphical programming system in order to automatically generate a graphical program implementing a script. The graphical programming system may support an application programming interface (API) that allows callers to create or edit graphical programs and add objects or nodes to graphical programs in order to achieve the desired functionality. For example, the prototyping environment may first call an API function to create a graphical program object, obtaining a reference to this object. The prototyping environment may then call an API function to add nodes representing the appropriate image processing functions to the graphical program object.

The graphical programming system may support any of various types of APIs for callers to use. For example, many applications are operable to call standard ActiveX/COM components. Thus, in one embodiment, the graphical programming system may expose COM objects that the prototyping environment may call to create the graphical program. In another embodiment, the graphical programming system may provide a graphical API for creating graphical programs. An exemplary graphical API that may be used for creating a graphical program is described below.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-readable memory medium that stores program instructions for creating a prototype for performing a machine vision process to solve a machine vision problem, wherein the program instructions are computer executable to perform:

displaying information indicating a plurality of machine vision problems;

receiving user input selecting a machine vision problem from the plurality of machine vision problems; and automatically creating a prototype in response to the selected machine vision problem, wherein the prototype comprises information specifying a sequence of functions, wherein the information specifying the sequence of functions is useable by a prototyping environment to invoke the sequence of functions to perform a machine vision process that solves the selected machine vision problem, wherein said automatically creating is performed without direct user input selecting the functions.

2. The memory medium of claim 1, wherein the prototype is not an executable program.

3. The memory medium of claim 1, wherein the plurality of machine vision problems comprise one or more machine vision problems associated with at least one of the categories from the group consisting of:

image processing, image analysis, industrial automation, test and measurement, and robotics.

4. The memory medium of claim 1, wherein said displaying information indicating a plurality of machine vision problems comprises displaying the plurality of machine vision problems categorized by one or more of color, shape, and pattern.

5. The memory medium of claim 1, wherein the machine vision process comprises one or more image processing functions, comprising one or more of:
- one or more filtering functions for smoothing, edge detection, and/or convolution;
- one or more morphology functions for modifying the shape of objects in an image, including erosion, dilation, opening, and/or closing;
- one or more thresholding functions for selecting and/or converting ranges of pixel values in images; and
- one or more particle filtering functions to filter objects based on shape measurements.

6. The memory medium of claim 1, wherein the machine vision process comprises one or more image analysis functions, comprising one or more of:
- a histogram function that counts and graphs a total number of pixels in each grayscale value;
- a line profile function that returns grayscale values of pixels along a line drawn through an image with a line tool and graphs the values;
- one or more particle analysis functions that computes measurements on objects in an image; and
- a 3D view function that displays an image using an isometric view in which each pixel from an image source is represented as a column of pixels in a 3D view, wherein the pixel value corresponds to an altitude of the column of pixels.

7. The memory medium of claim 1, wherein the machine vision process comprises one or more machine vision functions, comprising one or more of:
- an edge detection function that finds edges along a line drawn through an image with a line tool;
- a blob analysis function;
- a pattern matching function that locates regions of a grayscale image that match a predetermined template;
- a shape matching function that searches for the presence of a shape in an image and specifies the location of each matching shape;
- a caliper function that computes measurements, including distances, areas, and/or angles, based on results returned from other image processing functions; and
- a color matching function that quantifies which colors and how much of each color exist in a region of an image and uses this information to determine if another image contains the same colors in a substantially equal ratio.

8. The memory medium of claim 1,
wherein the information specifying the sequence of functions comprises a plurality of elements respectively specifying the sequence of functions.

9. The memory medium of claim 8, wherein said automatically creating the prototype comprises using previously stored information specifying the elements to include in the prototype.

10. The memory medium of claim 8,
wherein each element included in the prototype is a step representing a function.

11. The memory medium of claim 10, wherein an ordering is associated with the steps in the prototype, wherein the program instructions are further computer-executable to perform:
- performing the functions in the order of their respective corresponding steps in order to perform the machine vision process that solves the machine vision problem.

12. The memory medium of claim 8, wherein the program instructions are further computer-executable to perform:
- receiving user input to customize the machine vision process that is performed; and
- modifying the prototype in response to the user input;
- wherein said modifying the prototype comprises one or more of:
  - modifying an element in the prototype;
  - including another element in the prototype;
  - removing an element from the prototype.

13. The memory medium of claim 8, wherein the prototype comprises an object-oriented representation of the machine vision process, and wherein the elements comprise objects representing respective machine vision operations.

14. The memory medium of claim 8, wherein the prototype comprises a diagrammatic representation of the machine vision process, and wherein the elements comprise diagrammatic objects representing respective machine vision operations.

15. The memory medium of claim 1, further comprising:
- receiving information regarding an additional machine vision problem to indicate in the plurality of machine vision problems, wherein the information specifies a plurality of elements to include in a prototype in response to a user specifying the additional machine vision problem, and wherein the plurality of elements specify a second plurality of functions operable to perform a machine vision process that solves the additional machine vision problem; and
- displaying information indicating the additional machine vision problem along with the other machine vision problems in the plurality of machine vision problems.

16. The memory medium of claim 15,
wherein said receiving information regarding the additional machine vision problem comprises automatically receiving the information, without user input.

17. The memory medium of claim 15, wherein said receiving information regarding the additional machine vision problem comprises:
- connecting to a computer server;
- downloading the information from the computer server.

18. The of memory medium claim 1, wherein said automatically creating includes selecting the prototype from a plurality of stored prototypes, wherein the selected prototype corresponds to the selected machine vision problem.

19. The memory medium of claim 1, wherein the program instructions are further computer-executable to perform:
- displaying help information regarding the selected machine vision problem;
- wherein the help information includes information explaining the machine vision process that is performed in order to solve the selected machine vision problem.

20. The memory medium of claim 1, wherein the program instructions are further computer-executable to perform:
- programmatically generating a program executable to implement the machine vision process specified by the prototype.

21. The memory medium of claim 20,
wherein the program is a graphical program.

22. The memory medium of claim 1, further comprising:
- programmatically generating a script, wherein the script is executable to generate a program implementing the machine vision process specified by the prototype.

23. The memory medium of claim 1, wherein the plurality of machine vision problems comprises machine vision problems in at least one of the following fields:
- automotive;
- biomedical;
- chemical;
- electronics;

manufacturing; and
pharmaceuticals.

24. A method for creating a prototype for performing a machine vision process to solve a machine vision problem, the method comprising:
- displaying information indicating a plurality of machine vision problems;
- receiving user input selecting a machine vision problem from the plurality of machine vision problems; and
- automatically creating a prototype in response to the selected machine vision problem, wherein the prototype comprises information specifying a sequence of functions, wherein the information specifying the sequence of functions is useable by a prototyping environment to invoke the sequence of functions to perform a machine vision process that solves the selected machine vision problem, wherein said automatically creating is performed without direct user input selecting the functions.

25. The method of claim 24, wherein the prototype is not an executable program.

26. The method of claim 24, wherein the plurality of machine vision problems comprise one or more machine vision problems associated with at least one of the categories from the group consisting of:
- image processing, image analysis, industrial automation, test and measurement, and robotics.

27. The method of claim 24, wherein said displaying information indicating a plurality of machine vision problems comprises displaying the plurality of machine vision problems categorized by one or more of color, shape, and pattern.

28. The method of claim 24, wherein the machine vision process comprises one or more image processing functions, comprising one or more of:
- one or more filtering functions for smoothing, edge detection, and/or convolution;
- one or more morphology functions for modifying the shape of objects in an image, including erosion, dilation, opening, and/or closing;
- one or more thresholding functions for selecting and/or converting ranges of pixel values in images; and
- one or more particle filtering functions to filter objects based on shape measurements.

29. The method of claim 24, wherein the machine vision process comprises one or more image analysis functions, comprising one or more of:
- a histogram function that counts and graphs a total number of pixels in each grayscale value;
- a line profile function that returns grayscale values of pixels along a line drawn through an image with a line tool and graphs the values;
- one or more particle analysis functions that computes measurements on objects in an image; and
- a 3D view function that displays an image using an isometric view in which each pixel from an image source is represented as a column of pixels in a 3D view, wherein the pixel value corresponds to an altitude of the column of pixels.

30. The method of claim 24, wherein the machine vision process comprises one or more machine vision functions, comprising one or more of:
- an edge detection function that finds edges along a line drawn through an image with a line tool;
- a blob analysis function;
- a pattern matching function that locates regions of a grayscale image that match a predetermined template;
- a shape matching function that searches for the presence of a shape in an image and specifies the location of each matching shape;
- a caliper function that computes measurements, including distances, areas, and/or angles, based on results returned from other image processing functions; and
- a color matching function that quantifies which colors and how much of each color exist in a region of an image and uses this information to determine if another image contains the same colors in a substantially equal ratio.

31. A system for creating a machine vision prototype for performing a machine vision process to solve a machine vision problem, the system comprising:
- a processor;
- a memory coupled to the processor;
- a machine vision prototyping environment application stored in the memory, wherein the machine vision prototyping environment application is operable to:
  - display information indicating a plurality of machine vision problems;
  - receive user input selecting a machine vision problem from the plurality of machine vision problems; and
  - automatically create a prototype in response to the selected machine vision problem, wherein the prototype comprises information specifying a sequence of functions, wherein the information specifying the sequence of functions is useable by a prototyping environment to invoke the sequence of functions to perform a machine vision process that solves the selected machine vision problem, wherein the prototype is automatically created without direct user input selecting the functions.

32. A system for creating a machine vision prototype for performing a machine vision process to solve a machine vision problem, the system comprising:
- a client computer system, wherein the client computer system comprises:
  - a processor;
  - a memory coupled to the processor;
  - a machine vision prototyping environment application stored in the memory, wherein the machine vision prototyping environment application is operable to:
    - display information indicating a plurality of machine vision problems;
    - receive user input selecting a machine vision problem from the plurality of machine vision problems; and
    - select a first machine vision prototype from a plurality of possible machine vision prototypes, wherein the prototype comprises information specifying a sequence of functions, wherein the information specifying the sequence of functions is useable by a prototyping environment to invoke the sequence of functions to perform a machine vision process that solves the selected machine vision problem, wherein the prototype is automatically created without direct user input selecting the functions, wherein the first machine vision prototype implements a solution to the selected machine vision problem; and
- a server computer system, wherein the server computer system stores a plurality of machine vision prototypes;
- wherein the client computer system is operable to obtain machine vision prototypes from the server computer system.

33. The system of claim 32,
wherein the server computer system is operable to receive and store machine vision prototypes from a plurality of client computer systems.

34. A system for creating a machine vision prototype for performing a machine vision process to solve a machine vision problem, the system comprising:
 means for displaying information indicating a plurality of machine vision problems;
 means for receiving user input selecting a machine vision problem from the plurality of machine vision problems; and
 means for automatically creating a prototype in response to the selected machine vision problem, wherein the prototype comprises information specifying a sequence of functions, wherein the information specifying the sequence of functions is useable by a prototyping environment to invoke the sequence of functions to perform a machine vision process that solves the selected machine vision problem, wherein said automatically creating is performed without direct user input selecting the functions.

* * * * *